United States Patent
Yi et al.

(10) Patent No.: US 9,310,209 B2
(45) Date of Patent: Apr. 12, 2016

(54) TERMINAL AND METHOD FOR CONTROLLING THE SAME

(71) Applicant: LG ELECTRONICS INC., Seoul (KR)

(72) Inventors: Dongo Yi, Seoul (KR); Sungkyu Chie, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/333,166

(22) Filed: Jul. 16, 2014

(65) Prior Publication Data

US 2015/0031352 A1    Jan. 29, 2015

(30) Foreign Application Priority Data

Jul. 24, 2013    (KR) .......................... 10-2013-0087561

(51) Int. Cl.
*H04W 4/02* (2009.01)
*G01C 21/20* (2006.01)
*G01C 21/36* (2006.01)

(52) U.S. Cl.
CPC ............ *G01C 21/206* (2013.01); *G01C 21/362* (2013.01)

(58) Field of Classification Search
CPC ....................................................... H04W 4/02

USPC ........ 455/420, 456.1–456.3; 701/1, 410, 427, 701/468, 553
See application file for complete search history.

(56) References Cited

U.S. PATENT DOCUMENTS

| | | | |
|---|---|---|---|
| 2008/0036586 A1* | 2/2008 | Ohki | 340/539.13 |
| 2008/0234926 A1* | 9/2008 | Simonds et al. | 701/202 |
| 2009/0170525 A1* | 7/2009 | Baghdasaryan | 455/456.1 |
| 2011/0021211 A1* | 1/2011 | Ohki | 455/456.3 |
| 2011/0153654 A1* | 6/2011 | Lee | 707/769 |
| 2011/0238289 A1* | 9/2011 | Lehmann et al. | 701/201 |
| 2012/0059579 A1* | 3/2012 | Pierfelice et al. | 701/427 |
| 2012/0179361 A1* | 7/2012 | Mineta et al. | 701/410 |
| 2013/0158866 A1* | 6/2013 | Weir et al. | 701/468 |
| 2013/0166096 A1* | 6/2013 | Jotanovic | 701/1 |
| 2014/0365125 A1* | 12/2014 | Vulcano et al. | 701/533 |

\* cited by examiner

*Primary Examiner* — Nathan Taylor
(74) *Attorney, Agent, or Firm* — Lee, Hong, Degerman, Kang & Waimey

(57) ABSTRACT

Provided is a terminal including: an information extraction unit that extracts location information which is designated as a destination point; a display unit to which a graphic image for receiving a control command for displaying a source of the location information, and the extracted location information are output together; and a controller that controls the display unit in such a manner that a guide screen for guiding a path to the destination point that is selected by a user from among the pieces of location information.

16 Claims, 25 Drawing Sheets

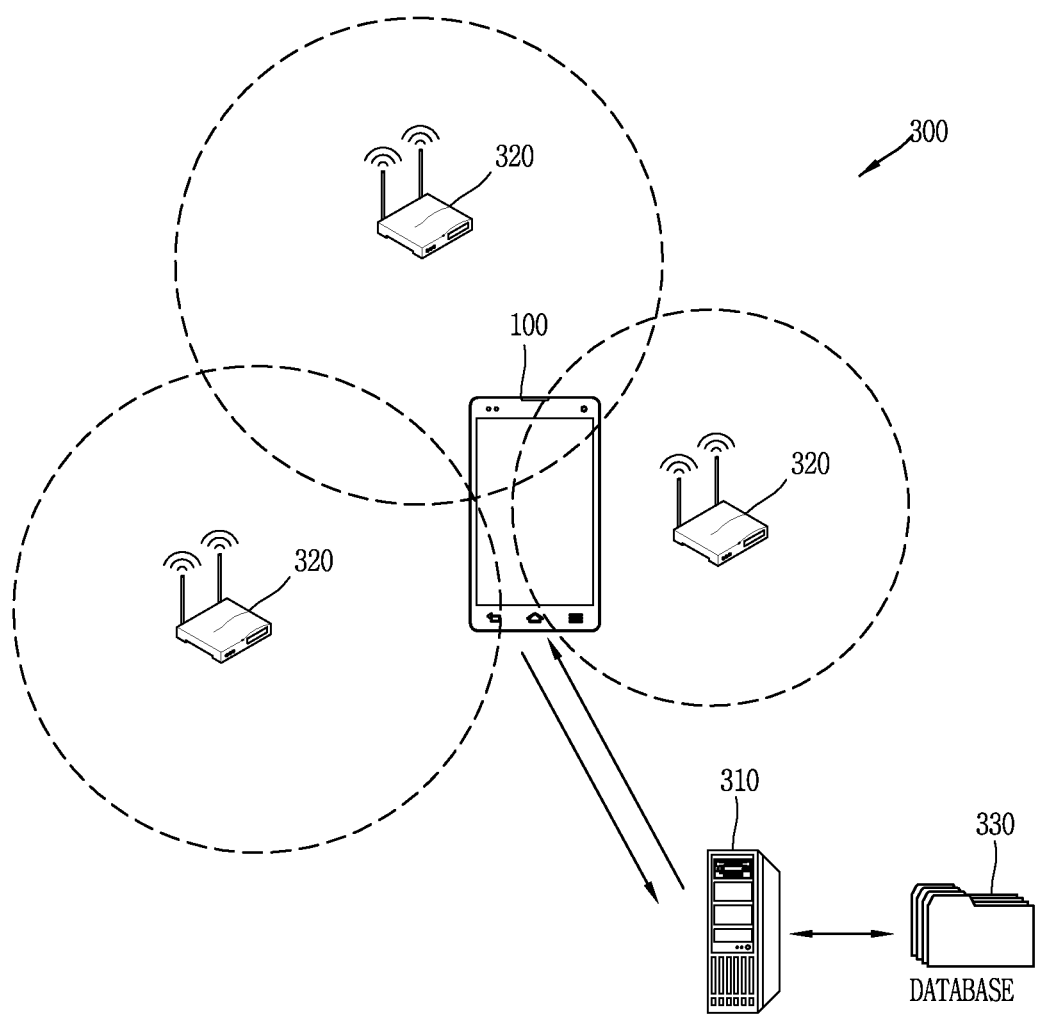

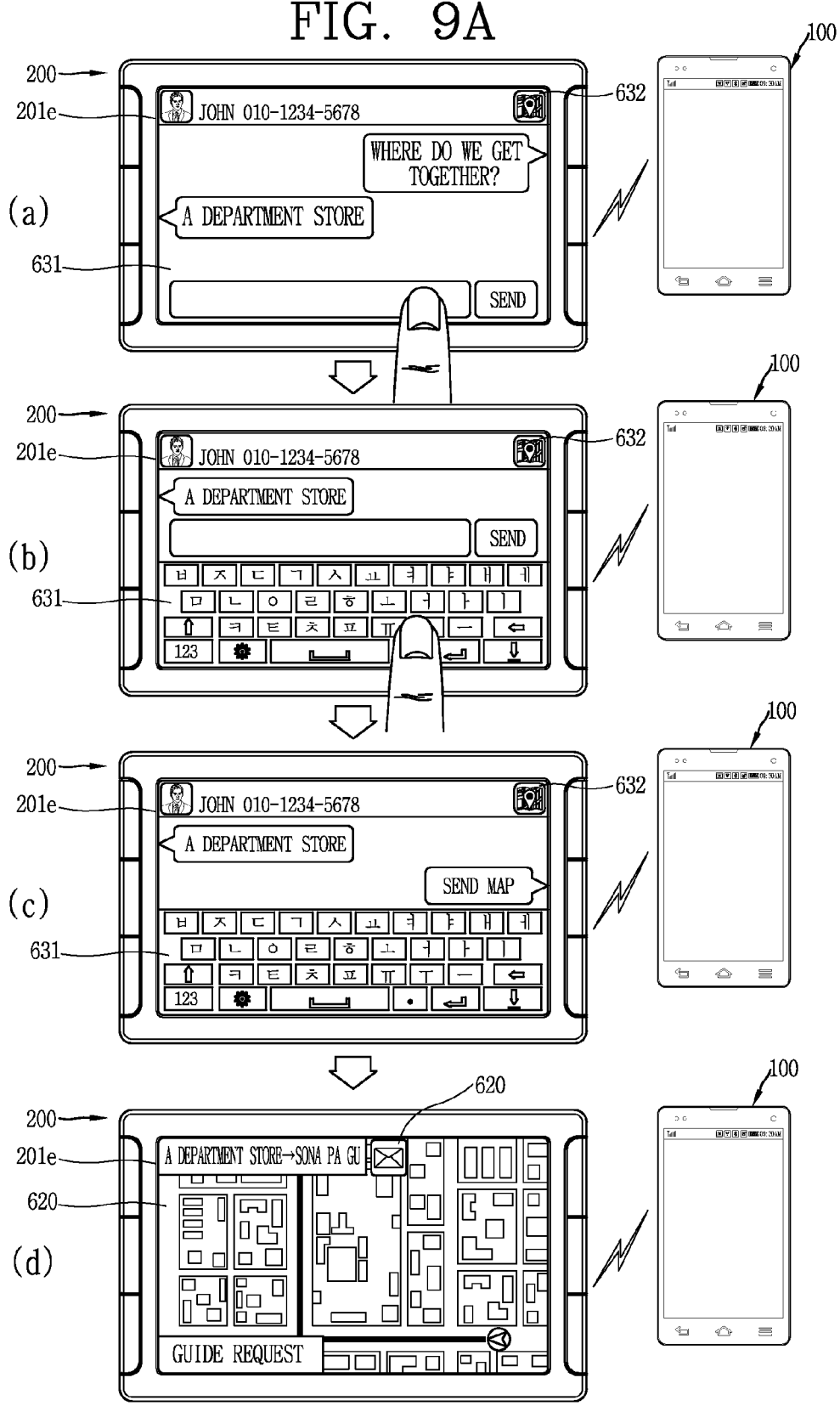

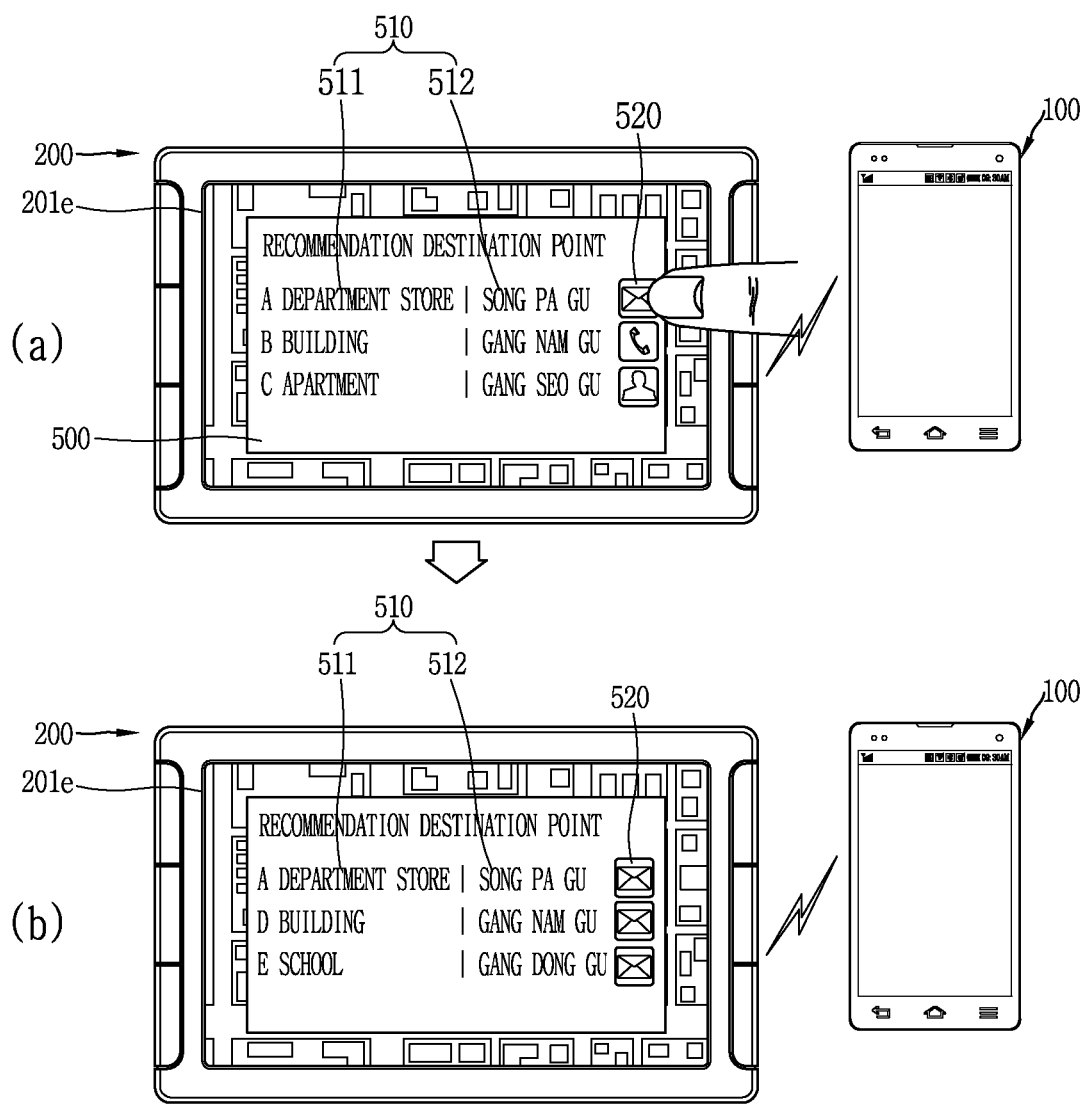

TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2013-0087561, filed on Jul. 24, 2013, the contents of which is incorporated by reference herein in its entirety.

BACKGROUND OF THE DISCLOSURE

1. Field of the Disclosure

The present disclosure relates to a terminal that provides a path to a destination point.

2. Background of the Disclosure

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like. Furthermore, structural and software modifications to the mobile terminal are considered for supporting and improving functions of the mobile terminal.

Recent terminals have various functions. For example, the terminals have a function of searching for a user-set destination and providing a user with a path to the destination point. In addition, while a user of the terminal is driving a vehicle, a location of the user is detected and path-guiding is provided in real time to the user.

In order to be provided with such a function, the user has to input a correct address or the destination point that he/she wants to reach. In order to input information, stored in a mobile terminal, as the destination point, the user has to go through steps of searching once more for stored data and manually executing the function.

If a large amount of information is included, the user has the inconvenience of finding out data that is provided or stored and inputting the correct address.

SUMMARY OF THE DISCLOSURE

Therefore, an aspect of the detailed description is to store backup data for a mobile terminal more easily and provide the backup data in a form that is distinguishable to a user.

To achieve these and other advantages and in accordance with the purpose of this specification, as embodied and broadly described herein, there is provided a a terminal including: an information extraction unit that extracts location information which is designated as a destination point; a display unit to which a graphic image for receiving a control command for displaying a source of the location information, and the extracted location information are output together; and a controller that controls the display unit in such a manner that a guide screen for guiding a path to the destination point that is selected by a user from among the pieces of location information.

In the terminal, the graphic image may correspond to an icon for an application that corresponds to a storage space in which the location information is stored.

In the terminal, based on a control command that is applied to the graphic image, the controller may execute the application and control the display unit in such a manner that an execution screen for controlling a function of the application is output.

In terminal, based on the control command, the controller may control the display unit in such a manner that the guide screen is switched to the execution screen.

In the terminal, a switch icon for receiving a touch input for switching to the guide screen may be displayed on the execution screen to which the guide screen is switched on the display unit.

The terminal may further include a speaker that outputs voice information for guiding the path to the selected destination point, in which the controller may control the speaker in such a manner that the voice information continues to be output while the execution screen is output on the display unit.

In the terminal, based on a touch input that is applied to the graphic image, at least one piece of location information that is extracted from a source that is selected by the touch input may be output together on the display unit.

In the terminal, based on a predetermined reference, the controller may prioritize the extracted pieces of location information, and may control the display unit in such a manner that the pieces of location information are output according to a result of the prioritization.

In the terminal, the extracted location information may be configured from at least one among text, an image, a voice, and a media file.

The terminal may further include a wireless communication unit that transmits or receives a wireless signal to and from an external terminal, in which the location information may be received from the external terminal.

In the terminal, the external terminal may be a mobile terminal, and the terminal may correspond to an image display apparatus that is configured to guide the path to the selected destination point.

In the terminal, if an event is received in the mobile terminal, the control unit may control the wireless communication unit in such a manner that information on the event is received, and executes the event.

In the terminal, the location information may correspond to information that is included in the event that is received from outside, or data that is stored by the user.

In the terminal, when the event is received while the guide screen for guiding the path to the selected destination point, the controller may control the display unit in such a manner that in-real-time location information is extracted from the event and is output on the guide screen.

In the terminal, when the in-real-time location information is selected by the user, the controller may change the destination point to the in-real-time location information.

In the terminal, the controller may control the display unit in such a manner that the in-real-time location information is displayed on the guide screen.

In the terminal, when the in-real-time location information is extracted based on the event, the controller may control the display unit in such a manner that an icon indicating the event is received is output, and based on a touch input, the controller may control the display unit in such a manner that the in-real-time location information is output.

To achieve these and other advantages and in accordance with the purpose of this specification, as embodied and broadly described herein, there is provided a method of controlling a terminal, including: extracting at least one piece of location information from stored data; outputting on a display unit a graphic image for displaying at least one piece of location information and a source of the location information; designating the location information as the destination point, based on a touch input that is applied to the location information; and outputting a guide screen including a path from a current location detected to the destination point.

The method may further include executing an application corresponding to the source, based on a control command that is applied to the graphic image; and outputting on the display unit an execution screen for controlling a function of the application.

The method may further include receiving an event while the guide screen is output; extracting in-real-time location information from data corresponding to the received event; and outputting together on the display unit the in-real-time location information and the graphic image corresponding to the source from which the location information is extracted.

According to the present invention, the user can set the destination point more easily using the location information that is extracted from the data that is stored in the connected mobile terminal (that is, the external terminal). Accordingly, the user does not separately need to input an address of the destination point or search for a location and can be provided back with the location information, which have been forgotten.

In addition, returning to a state in which the location information takes place by displaying the source from which the location information is extracted, and the desired destination point is accordingly easily set and is partially performed on the source. Thus, the location information that is provided while guiding the path to the destination point is used in a more diverse manner.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 5A and 5B are diagrams, each illustrating a telecommunication system in which the mobile terminal according to the present invention operates;

FIGS. 9A and 9B are diagrams for describing a method of controlling a function of an application on an execution screen while a path-guiding function is performed;

FIGS. 11A and 11B are diagrams for describing a control method of outputting some of the multiple extracted pieces of location information;

DETAILED DESCRIPTION OF THE DISCLOSURE

Hereinafter, the present disclosure will be explained in more detail with reference to the attached drawings. For the sake of brief description with reference to the drawings, the same or equivalent components will be provided with the same reference numbers, and description thereof will not be repeated. The suffixes "module" and "unit or portion" for components used in the following description merely provided only for facilitation of preparing this specification, and thus they are not granted a specific meaning or function. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC and an ultra book. However, it will be obvious to those skilled in the art that the present invention may be also applicable to a fixed terminal such as a digital TV and a desktop computer, except for specific configurations for mobility.

Figure 1:
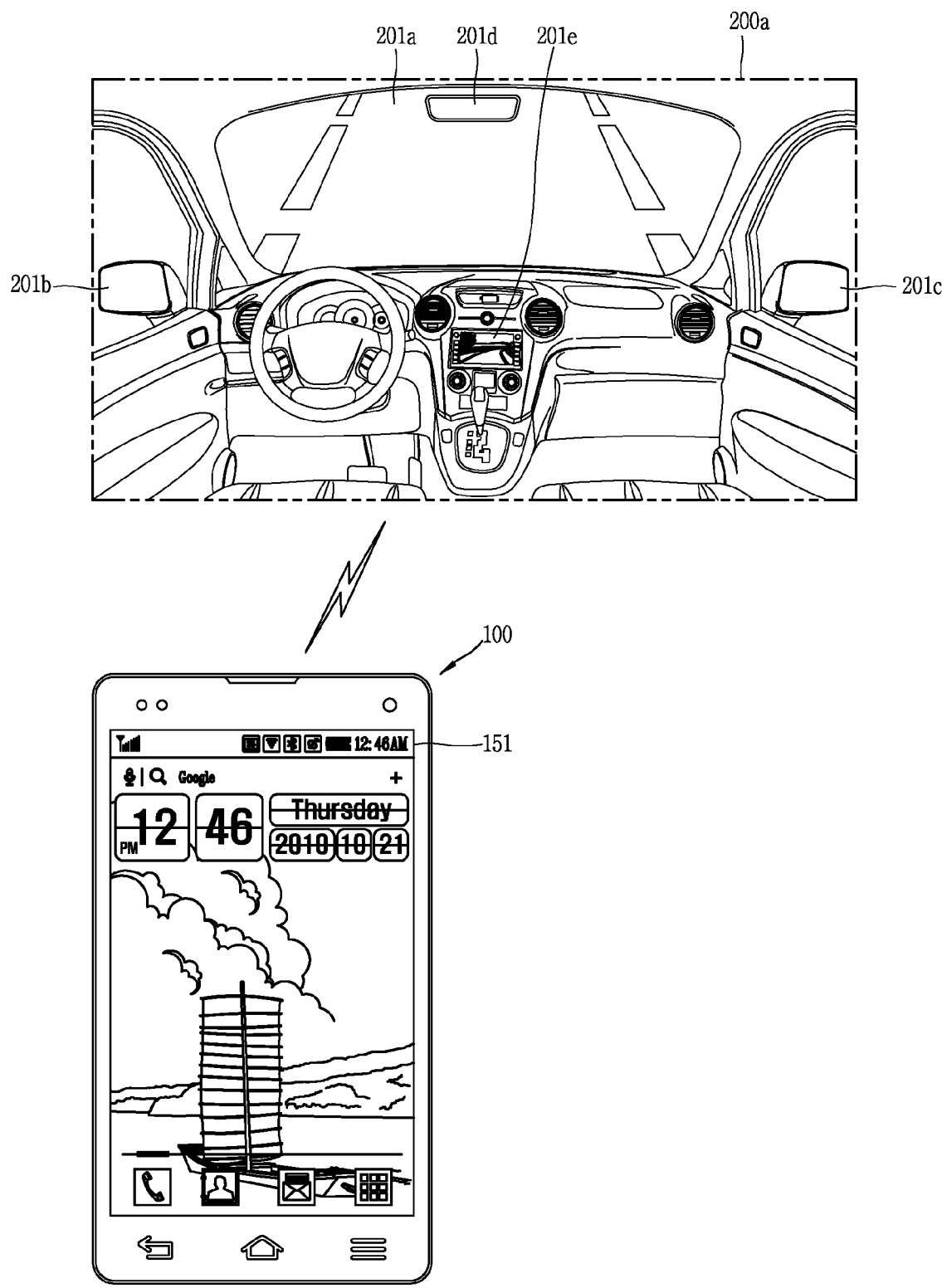
FIG. 1 is a diagram illustrating a mobile terminal according to one embodiment of the present invention and an in-vehicle image display apparatus that connects to the mobile terminal.

FIG. 1 is a diagram illustrating a mobile terminal according to one embodiment of the present invention and an in-vehicle image display apparatus that connects to the mobile terminal.

A mobile terminal 100 described in the present disclosure includes a mobile phone, a smart phone, a laptop computer, a digital broadcast-dedicated terminal, a personal digital assistant (PDA), a portable multimedia player (PMP), a slate PC, a tablet PC, an high-end subnotebook such as a Ultrabook notebook, and the like.

In addition, as illustrated in FIG. 1, according to various viewing angles for driving that depend on a moving state of the vehicle, the in-vehicle image display apparatus 200a that is described in the present disclosure displays an image that is transmitted from the connected mobile terminal 100, on a reflecting mirror (for example, external rear view mirrors 201b and 201c and an rear view mirror 201), a display unit 201e of an navigation apparatus, or a dashboard of the vehicle. Alternatively, the in-vehicle image display apparatus 200a displays the image, for example, on a front window 201a of the vehicle using a head-up display or a projector. In addition, the in-vehicle image display apparatus 200a transmits to the connected mobile terminal 100 an image that is displayed on the reflecting mirror (for example, the external rear view mirrors 201b and 201c, and the internal rear view mirror 201d), the display unit 201e, the dashboard and/or for example, the front window 201a of the vehicle.

In this manner, a display unit of the in-vehicle image display apparatus 200a is provided at a position that is positioned a distance away from a main body of an image display apparatus 200 and as described below, the display units may be provided according to the drive viewing angle.

In addition, as illustrated in FIG. 1, in addition to the in-vehicle display apparatus 200a, the in-vehicle image display apparatus described in the present disclosure includes a second image display apparatus 200b that is provided in a rear seat of the vehicle in an attachable and detachable manner, and a third image display apparatus 200c of a mobile terminal that is carried by a different passenger in the vehicle.

In addition, in this manner, the in-vehicle image display apparatus 200a, the mobile terminal 100, and the different image display apparatuses 200b and 200c are connected to one another through the mobile terminal 100 and thus an outside-of-vehicle situation (for example, appearance of an object in a blind spot and so on), an inside-of-vehicle state information (for example, a brake operation signal), and information (for example, a path-guiding map) relating to a driving path or content information (for example, photograph information and the like) for an entertainment effect are exchanged among them. This is as if one vehicle system operates.

The in-vehicle image display apparatuses 200a, 200b, and 200c communicate with the display unit whose vendor is different from vendors of them, through the mobile terminal 100. In addition, the in-vehicle image display apparatuses 200a, 200b, and 200c may be connected to one mobile terminal and may be connected to the multiple mobile terminals.

On the other hand, the in-vehicle image display apparatuses 200a, 200b, and 200c may be connected to an information provider and the like that provides traffic information and various items of data (for example, a program, an executable file, and the like), over a cable or wireless communication network, such as a Local Area Network (LAN) or a Wide Area Network (WAN). In addition, the vehicles here include all possible carriers that are realized using a mechanical or electronic apparatus to take people or thing from one place to another, such as a car, a bus, a train, a ship, and an airplane.

The mobile 100 and the in-vehicle image display apparatus 200 that is connected to the mobile terminal 100 are described, using as an example a vehicle head-up display (HUD) unit 200a including the multiple displays. Referring back to FIG. 1, the mobile terminal 100 is connected to the in-vehicle image display apparatus 200 in a cable or wireless manner. Thus, the mobile terminal 100 receives and image-processes a screen that is displayed on the in-vehicle image display apparatus 200 and then transmits the image-processes screen to a different image display apparatus or a different display. In addition, the mobile terminal 100 transmits to the image display apparatus 200 a result (for example a screen image or a voice) of executing an application on the mobile terminal 100 through an interface or information on a vehicle destination or on a moving path.

At this point, the mobile terminal 100 may be positioned inside of the vehicle and may be positoned outside of the vehicle but within a range in which a wireless connection is possible.

In addition, the in-vehicle image display apparatus 200 is connected to at least one mobile terminal 100 in a cable or wireless manner. Thus, the in-vehicle image display apparatus 200 receives the information on the vehicle destination or on the moving path, which is transmitted from the mobile terminal 100, and output the received information or transmits the received information to the in-vehicle image display apparatus 200. A state in which in this manner, the mobile terminal 100 is connected to and thus operates in connection with the image display apparatus 200 that is positioned in the vehicle is referred to as a "connected-car state."

In this manner, the "connected-car state" is entered, through a predetermined interface, the mobile terminal 100 transmits to the image display apparatus 200 an screen being displayed on the mobile terminal 100 or a voice, or a screen that is displayed on the different display apparatus 200b or 200c. At this time, interface units for transmitting screen transmission include, for example, wireless communication supporting units such as a Wireless Fidelity (WiFi) transmission and reception unit and a Bluetooth transmission and reception unit and cable communication supporting units such as a Universal Serial Bus (USB) terminal.

In addition, the image display apparatus 200 obtains external images of scenes that appear in front of the vehicle using a camera provided in the vehicle, for example, a front camera 277 or a front camera (not illustrated) in an electronic recording apparatus, and transmits the obtained image to the connected mobile terminal 100. Then, the mobile terminal 100 analyzes the captured image and grasps a direction of a driver's face and/or a direction in which driver's eyes face. Accordingly, a change in the driver's gaze is detected while driving the vehicle.

In this manner, the mobile terminal 100 performs at least one function that corresponds to the detected change in the driver's gaze. For example, when the driver's gaze is fixed to in front of the vehicle and then is fixed to the navigation apparatus, the mobile terminal 100, as described in detail below, receives an image in real time that is displayed on the navigation apparatus to which the driver's gaze is turned and performs control in such a manner that the received image is displayed on a different in-vehicle image display apparatus.

Figure 2:
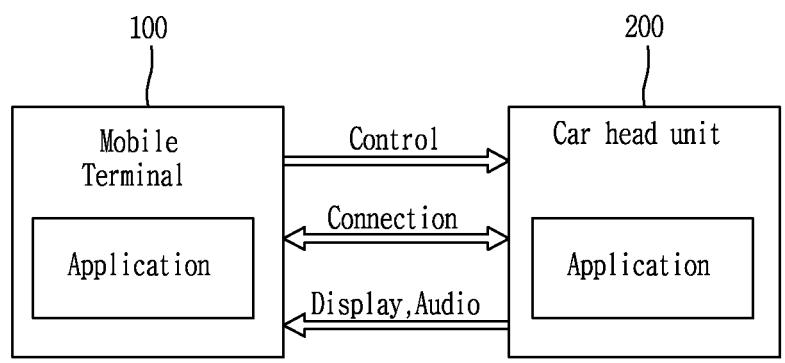
FIG. 2 is a diagram schematically illustrating a state where the mobile terminal and the in-vehicle image display apparatus that are connected to each other interact with each other according to one embodiment of the present invention.

As illustrated in FIG. 2A, according to one embodiment of the present invention, the connected mobile terminal 100 and the image display apparatus 200 are included that are connected to each other in the vehicle.

The mobile terminal 100 is connected to the in-vehicle image display apparatus 200 in a wireless manner and transmits at least, one among the image and the voice, to the image display apparatus 200.

The image display apparatus 200 is mounted in the vehicle in a fixed manner, and is connected to the mobile terminal 100 in a wireless manner. Thus, the image display apparatus 200 receives at least one, among the image and the voice, from the mobile terminal 100. In addition, the image display apparatus 200 outputs at least one, among the image and the voice that are received from the mobile terminal 100.

The image display apparatus 200 receives an input from a user and transmits the received unit to the mobile terminal 100. For example, when the user applies a touch input through a touch screen that is provided in the image display apparatus 200, a position of a point on the screen image, to which the touch input is applied, is recognized, and information on the recognized position is transmitted to the mobile terminal 100. The mobile terminal 100 determines that a touch event occurs at the point to which the touch input is applied, and performs an operation corresponding to the touch event that occurs. That, the user controls the operation of the mobile terminal 100 using the touch screen, a hard key, or the like that is provided in the image display apparatus 200.

One application example of the image transmission system is the case when the user executes a path-guiding application (alternatively, a dialing application, a phone book application, or a moving image reproduction application or the like), the mobile terminal 100 transmits an execution image of the path-guiding application to the image display apparatus 200, and the execution image of the path-guiding application is displayed in the image display apparatus 200.

The user can view the execution image of the path-guiding application on a larger screen of the image display apparatus 200 instead of on a small screen of the mobile terminal 100. In addition, the user can hear a path-guiding voice through a speaker provided in the vehicle instead of through a speaker of the mobile terminal 100. In addition, when the user selects a menu associated with the path-guiding using the touch screen or the hard key that is provided in the image display apparatus 200, an operation is performed on the corresponding menu in the mobile terminal 100. Then, the mobile terminal 100 transmits a result of performing the operation on the corresponding menu to the image display apparatus 200 and output the result.

The mobile terminal 100 and the image display apparatus 200 are connected to each other, based on a short-range communication standard such as a Bluetooth standard, a wireless Internet standard such as a Wi-Fi standard, and an external-apparatus interface standard such as a Universal Serial Bus standard.

In addition, a server application that provides a service at the request of a client is installed in the mobile terminal 100, and a client application that can be connected to the service provided from a server is installed in the image display apparatus 200.

The server application on the mobile terminal 100 captures a screen on the mobile terminal 100 regardless of a type of application on the mobile terminal 100 and transmits the captured image to the client application on the image display apparatus 200. In addition, from the client application, the server application controls the operation of the mobile terminal 100, based on information on an event that occurs in the image display apparatus 200.

For example, the image display apparatus 200 remotely controls the mobile terminal 100 in a Virtual Network Computing (VNC) method in which a Remote Frame Buffer (RFB) protocol is used that provides remote access to a graphic user interface. In the VNC method, while the mobile terminal 100 transfers a screen update over the network to the image display apparatus 200, an input event that occurs in the image display apparatus 200 is transmitted to the mobile terminal 100.

In addition, the mobile terminal 100, for example, transmits a voice to the image display apparatus 200, a headset, a hands-free kit or the like, based on an Advanced Audio Distribution Profile (A2DP) that defines quality of audio (stereophonic or monophonic) that is streamed from a first apparatus to a second apparatus through a Bluetooth connection, and particularly based on a Headset Profile (HSP) for a Bluetooth headset and on a Hands-free Profile (HFP) for a vehicle hands-free kit.

On the other hand, the mobile terminal 100 and the image display apparatus 200 exchanges pieces of additional information, based on separate protocols. For example, the image display apparatus 200 provides the mobile terminal 100 with vehicle state information, such as moving-vehicle information, speed information, and information on an amount of remaining fuel.

Some applications that are installed in the mobile terminal 100 use the vehicle state information received from the image display apparatus 200 through the use of separate protocols. In addition, such applications provide the image display apparatus 200 with application information, such as a type of application (for example, a path-guiding application, a multimedia application, a game, or the like), a type of Graphic User Interface (for example, a map, video, a menu, or the like), an application state (for example, whether an application is executed in the foreground or in the background, or the like).

Figure 4:
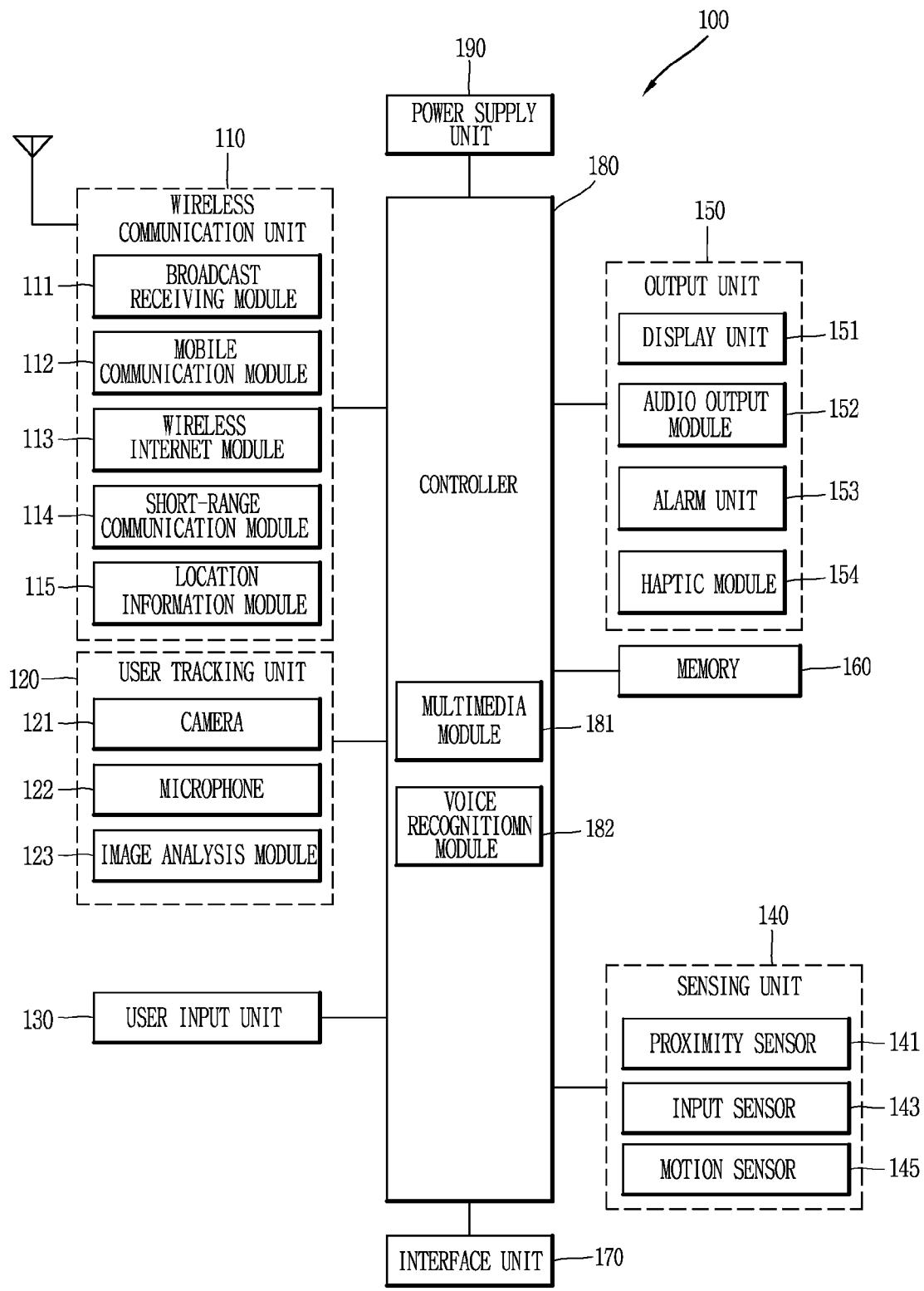
FIG. 4 is a block diagram illustrating the mobile terminal according to one embodiment of the present invention.

FIG. 4 is a block diagram illustrating the mobile terminal according to one embodiment of the present invention.

As shown in FIG. 4, the mobile terminal 100 includes a wireless communication unit 110, a user tracking unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views another party, whereas the voice call mode indicates a call performed while a user does not view another party. For implementation of the video call mode and the voice call mode, the mobile communication module 112 is configured to transceive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

Referring to FIG. 4, the user tracking unit 120 is configured to receive an audio or video signal. The user tracking unit 120 may include a camera 121, a microphone 122, and an image analysis module 123. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or a capturing mode, the display unit 151 may display a captured and/or received image or a GUI or a UI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The display unit 151 may be implemented in two or more in number according to a configured aspect of the mobile terminal 100. For instance, a plurality of displays may be arranged on one surface integrally or separately, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, a switchable scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 4, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an input sensor (e.g., ultrasonic sensing unit) 143, and a motion sensor 145.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer or the like.

The alarm unit 153 outputs a signal for informing about an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, using vibration to inform about an occurrence of an event. The video or audio signals may be also outputted via the audio output module 152, so the display unit 151 and the audio output module 152 may be classified as parts of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. Such video signal or audio signal may be output through the display unit 151 or the audio output module 152. Accordingly, the display unit 151 or the audio output module 152 may be categorized into part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic module 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are inputted or outputted. The memory 160 may store therein data on vibrations and sounds of various patterns output when a touch is input onto the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs the controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display unit (hereinafter, will be referred to as 'touch screen' 151) in the locked state.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 5A:
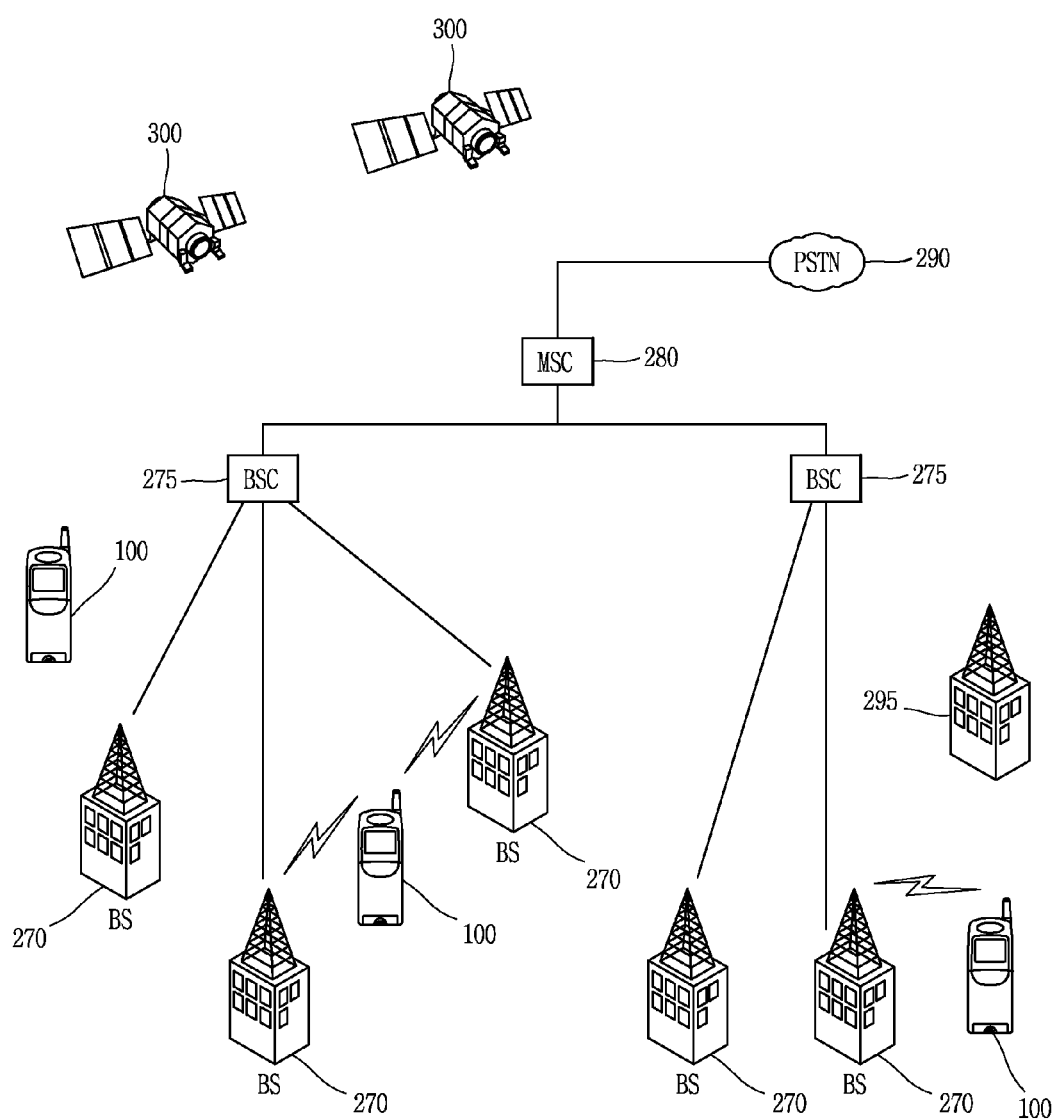

FIGS. 5A and 5B are conceptual views of a communication system operable with a mobile terminal 100 in accordance with the present disclosure.

First, referring to FIG. 5A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 5A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 5A, transmits a broadcast signal to the mobile terminals 100 operating within the system. The broadcast receiving module 111 (FIG. 4) is typically configured inside the mobile terminal 100 to receive broadcast signals transmitted by the BT 295.

FIG. 5A further depicts several Global Positioning System (GPS) satellites 300. Such satellites 300 facilitate locating the position of at least one of plural mobile terminals 100. Two satellites are depicted in FIG. 5A, but it is understood that useful position information may be obtained with greater or fewer satellites than two satellites. The GPS module 115 (FIG. 4) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 5B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 5B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Figure 6A:
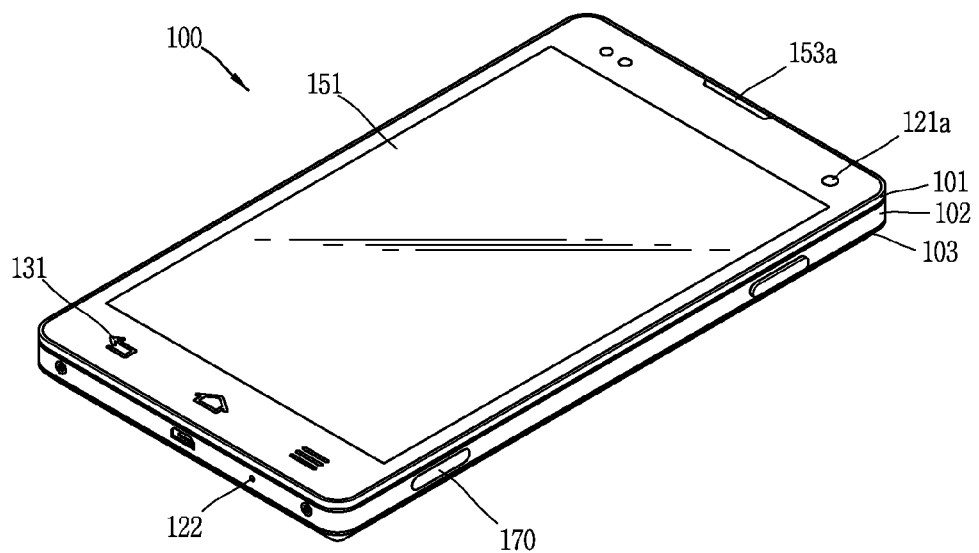
FIG. 6A is a perspective diagram illustrating the mobile terminal according to one embodiment of the present invention when viewed from front.

FIG. 6A is a front perspective view of the mobile terminal 100 according to an embodiment of the present invention.

The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of the body may include a front case 101 and a rear case 102. A space formed by the front case 101 and the rear case 102 may accommodate various components therein. At least one intermediate case may further be disposed between the front case 101 and the rear case 102. A battery cover 103 for covering a battery 191 may be detachably mounted to the rear case 102.

Such cases may be formed by injection-molded synthetic resin, or may be formed using a metallic material such as stainless steel (STS) or titanium (Ti).

At the front case 101, may be disposed a display unit 151, a first audio output unit 153a, a first camera 121a, a first user input unit 131, etc. On the side surfaces, may be disposed a microphone 122, an interface unit 170, a second user input unit 132, etc.

The display unit 151 may output information processed in the mobile terminal 100. The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 6A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 6b), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 6B:
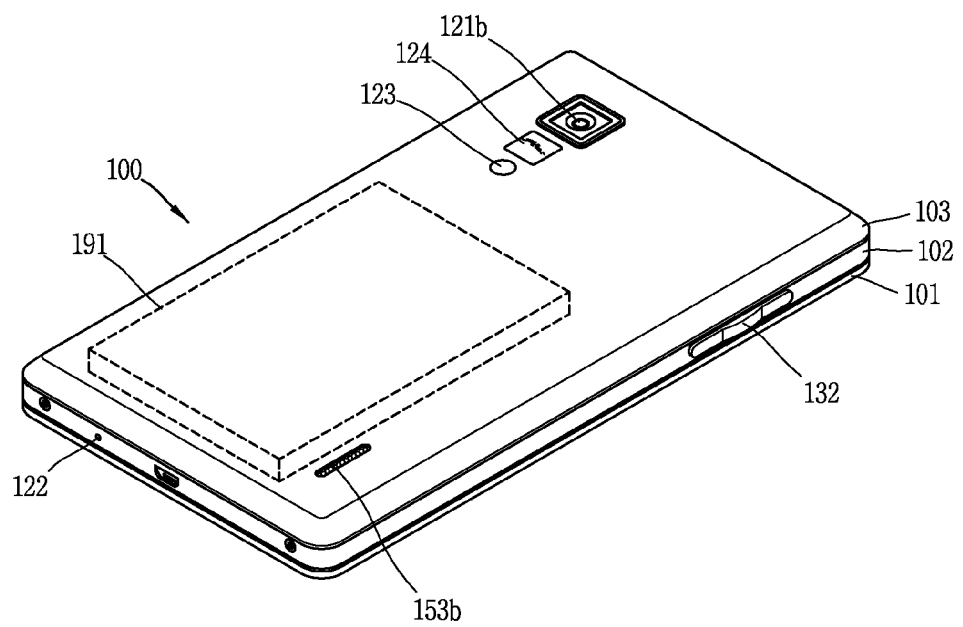
FIG. 6B is a perspective diagram illustrating the mobile terminal in FIG. 6A when viewed from rear.

FIG. 6B is a rear perspective view illustrating mobile terminal 100 illustrated in FIG. 6A.

Referring to FIG. 6B, a second camera 121b may be additionally mounted at a rear surface of the terminal body, namely, the rear case 102. The second camera 121b has an image capturing direction, which is substantially opposite to the direction of the first camera unit 121a (refer to FIG. 6A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 6A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 4) may be provided in the terminal body in a retractable manner.

A power supply unit 190 (refer to FIG. 4) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

FIG. 4 is a diagram illustrating a configuration example of the in-vehicle image display apparatus 200 that connects to the mobile terminal 100 according to one embodiment of the present invention.

The in-vehicle image display apparatus 200 according to one embodiment of the present invention is configured to include multiple displays. The multiple displays are arranged in such a manner that they are positioned a distance away from the in-vehicle image display apparatus 200, for example, a main body of the vehicle head-up display (HUD). For example, a main body of the in-vehicle image display apparatus is the vehicle head-up display (HUD) and the multiple displays included in the vehicle head-up display (HUD) include a front window of the vehicle, an instrument panel of the vehicle, external rear view mirrors of the vehicle, an internal rear view mirror of the vehicle and the like. In addition, the vehicle head-up display (HUD) includes a project in order to display a predetermined image on the multiple displays. That is, an image being already stored in the memory or an image being received from the connected mobile terminal 100 is displayed on at least one, among the multiple displays, using the project included in the vehicle head-up display (HUD) described above.

As illustrated in FIG. 4, the image display apparatus 200 is configured from a controller (for example, a central processing unit (CPU) 212 that controls the image display apparatus 200 across the board, a memory 213 in which various type of information are stored, a key controller 211, and a main board 210 into which an LCD controller 214 controlling a liquid crystal display (LCD) is built.

Map data for displaying path-guiding information on a digital map is stored in the memory 213. In addition, a traffic information collection/control algorithm for inputting the traffic information according to a condition of a road along which the vehicle moves currently, and information for controlling the algorithm are stored in the memory 213.

The main board 210 includes a wireless communication module 206 that enables performing of wireless communication between the image display apparatus 200 and an external mobile terminal 100 or between the image display apparatus 200 and a network on which the image display apparatus 200 is placed, a location information module 207 that receives a GPS signal for finding a location of the vehicle, tracking the vehicle moving path from a departure point to a destination point, or doing other things, or transmits the traffic information, which is collected by the driver, in a manner that is carried by a Global Position System (GPS) signal, a CD desk 208 for reproducing a signal recorded in a compact disk (CD), a gyro sensor 209, and the like. The wireless communication module 206 and the location information module 207 transmit and receive the signal through antennas 204 and 205 for the wireless communication module 206 and the location information module 207, respectively.

The wireless communication module 206 includes a mobile communication module 206a, a wireless Internet module 206b, a short-range communication module 206c, and the like. The mobile communication module 206a, as a mobile terminal to which a serial number is assigned, transmits and receives the wireless signal to and from at least one, among a base station, an external mobile terminal, and a server, over a mobile communication network. The wireless Internet module 206b that is connected to the wireless Internet by using a wireless communication technology, such as Wireless LAN (WLAN), WiFi, Wireless Broadband (Wibro), World Interoperability for Microwave Access (Wimax), or High Speed Downlink Packet Access (HSPPA). The short-range communication module 206c performs communication by using a short-range communication technology, such as Bluetooth, Radio Frequency Identification (RFID), Infrared Data Association (IrDA), Ultra Wideband (UWB), or Wireless LAN (including a Bluetooth standard, a 802.11n standard and the like).

In addition, a broadcast reception module 222 is connected to the main board 210 and receives a broadcast signal through an antenna 223. A display unit (LCD) 201 that controlled by the LCD controller 214 through an interface board 203, a front board 202 that is controlled by the key controller 211, and a camera 227 that captures an image inside of and/or outside of the vehicle are connected to the main board 210. Various video signals and character signals are displayed on the display unit 201. Buttons for inputting various key signals are provided on the front board 202. The front board 202 provides the main board with the key signal corresponding to the button selected by the driver. In addition, the display unit 201 includes a proximity sensor and a touch sensor (touch screen) in FIG. 3.

A menu key for directly inputting the traffic information is provided on the front board 202. The menu key is configured in such a manner that it is controlled by the key controller 211. In addition, the front board 202 includes the menu key for controlling displaying of a screen.

The audio board 217 is connected to the main board 210 and processes various audio signals. The audio board 217 is configured to include a microcomputer 219 for controlling the audio board 217, a tuner 218 that receives a radio signal, a power supply unit 216 that supplies electric power to the microcomputer 219, and a signal processing unit 215 that processes various types of voice signals.

In addition, the audio board 217 is configured to include a radio antenna 220 for receiving the radio signal and a tape deck 221 for reproducing an audio tape. The audio board 217 may further include a voice output unit (for example, an amplifier) 226 for outputting the voice signal that is signal-processed in the audio board 217.

The voice output unit (the amplifier) 226 is connected to a vehicle interface 224. That is, the audio board 217 and the main board 210 are connected to the vehicle interface 224. A hands-free kit 225a for inputting a voice signal, an air bag 225b for the safety of a diver and passengers, a speed sensor 225c for detecting a vehicle speed, and the like may be connected to the vehicle interface 224. The speed sensor 225c calculates a vehicle speed and provides the calculated vehicle speed to the controller 212.

A navigation session (or a search unit) 300, such as the GPS satellite 300 and WPS 300 shown in FIGS. 5A and 5B, respectively, applied to the image display apparatus 200 generates the path-guiding information, based on the map data and information on a current location of the vehicle, and notifies the driver of thegenerated path-guiding information.

The display unit 201 detects a proximity touch within a display window through the proximity sensor. For example, when a pointer (for example, a finger or a stylus pen) comes into proximity touch with the display unit 201, the display unit 201 detects a position of the proximity touch and outputs location information corresponding to the detected position to the controller 212.

In addition, the multiple displays 201, as described above, may be provided, and a different image corresponding to the views angle for driving the vehicle and an item of map data for performing the path-guiding according to the driving of the vehicle are displayed on each of the multiple displays. In addition, the display unit 201 is connected to at least one camera 227, and the camera 227 captures an image of the user within a predetermined range with respect to the display unit 201 and transfers the captured image to an external apparatus being connected or to the main board 210.

Generally, the camera 227 is built into the front of the vehicle or is attached to the front of the vehicle in a detachable manner, thus capturing the external images of scenes that vary as the vehicle moves. In addition, a camera built into the electronic recording apparatus may substitute for the camera 227. In addition, the multiple cameras 227 are installed, for example, in a position in which the external rear view mirror or the internal rear view mirror is arranged, and capture the external images that correspond to the various view angles for driving, respectively. In addition, while rotating in all directions, one camera may capture the external images that correspond to the various view angles for driving, respectively, which vary as the vehicle moves.

On the other hand, the map data for searching for the driving path is stored in a memory 213 or is received from an external network through a wireless communication unit 110. In addition, the map data already stored in the memory 213 is updated based on update information received through the wireless communication unit 110.

The voice recognition module 301 recognizes a voice generated by the driver or the passenger and performs a corresponding function according to the recognized voice signal. For example, when the driver or the passenger says "Search," the voice recognition module 301 recognizes a corresponding voice command and transfers the recognized voice command to the controller 212. Then, the controller 212 performs a search function for collecting information relating to already-selected text.

The navigation session 300 applied to the image display apparatus 200 displays the driving path on the map data. When the location of the mobile communication terminal 100 is within a predetermined distance from a blind spot included in the driving path, the navigation session 300 automatically sets up a connection to a terminal (for example, a vehicle navigation apparatus) mounted in the vehicle in the vicinity and/or to a mobile terminal being carried by a pedestrian in the vicinity over a wireless network (for example, a short-distance wireless communication network) that is set up through wireless communication. Thus, the navigation session 300 receives the location information on the vehicle in the vicinity from the terminal mounted in the vehicle in the vicinity and receives the location information on the pedestrian from the mobile terminal being carried by the pedestrian in the vicinity.

On the other hand, the main board 210 is connected to an interface unit (not illustrated), and the interface unit (not illustrated) includes an external-apparatus interface unit and a network interface unit. The external-apparatus interface unit performs a function of connecting an external apparatus and the image display apparatus 200. To do this, the external-apparatus interface unit includes an A/V input/output unit (not illustrated) or a wireless communication unit (not illustrated). The external-apparatus interface unit is connected, for example, to an external apparatus, such as a digital versatile disk (DVD) player, a Blu-ray Disk player, a game apparatus, a camera, a camcorder, or a computer (a notebook, in a cable or wireless manner. In addition, the network interface unit is connected to a predetermined web page through a connected network or a different network linked to the connected network. That is, the network interface unit is connected to the predetermined web page to exchange data with the corresponding server.

According to the embodiment of the present invention, the image display apparatus 200 may be a head-up display (HUD), be a front window or an instrument panel of the vehicle, on which an image projected through a projector is displayed, or be a display apparatus that is positioned in the rear seat of the vehicle. At this point, if the image display apparatus 200 is the display apparatus that is positioned in the rear seat of the vehicle, the image display apparatus 200 communicates with the head-up display (HUD) or the projector positioned in the front seat of the vehicle through the wireless communication module 206.

Figure 3:
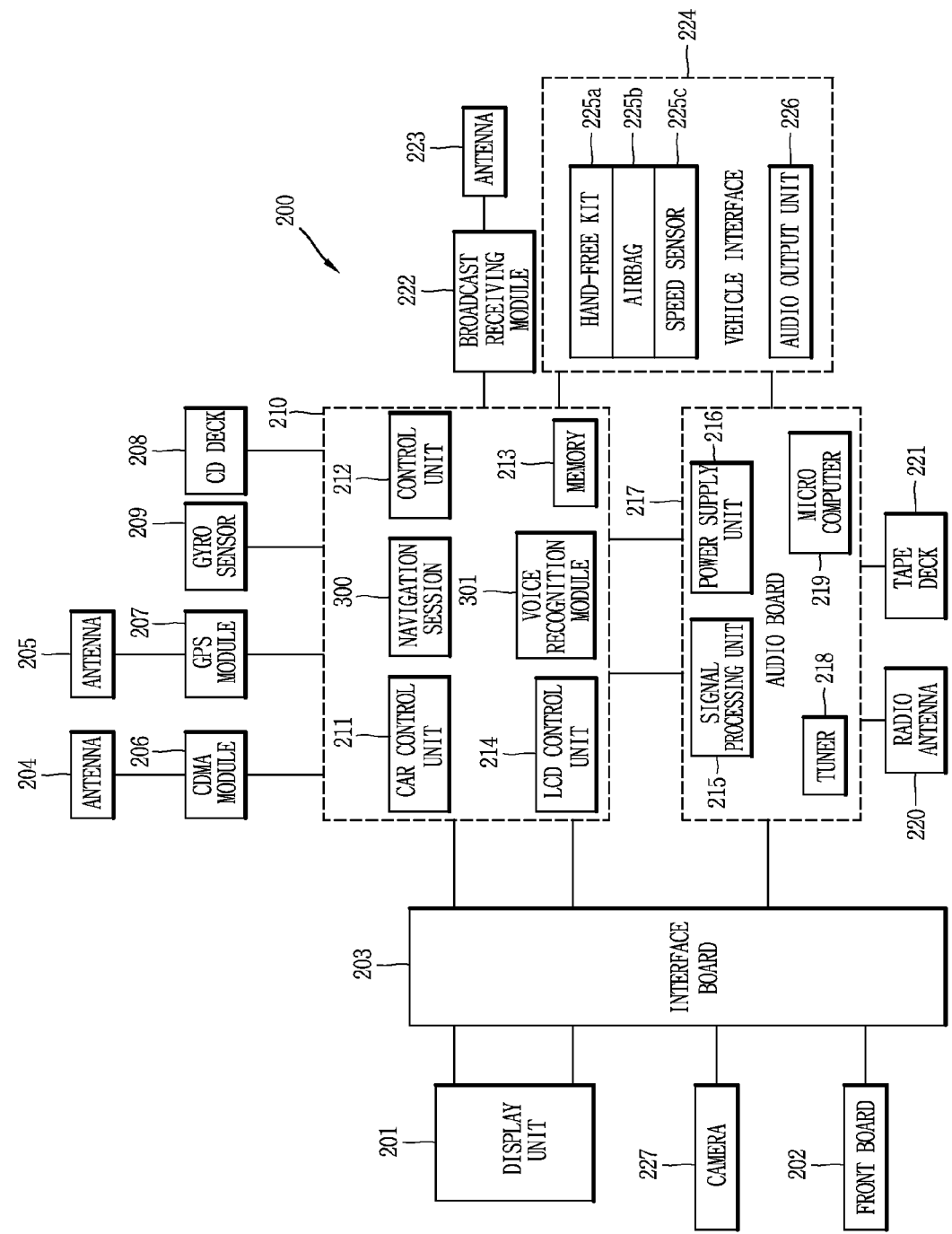
FIG. 3 is a diagram illustrating a configuration example of the in-vehicle image display apparatus that connects to the mobile terminal according to one embodiment of the present invention.

The mobile terminal 100 (refer to FIG. 3) that has at least one configuration, among the configurations described above, according to the embodiment of the present invention, is connected to the in-vehicle image display apparatus 200 (refer to FIG. 4) described above, through the wireless communication unit 110 (refer to FIG. 3).

At this point, the mobile terminal 100 refers to a portable terminal that is carried by the driver, and the in-vehicle image display apparatus 200 outputs the external images that correspond to the scenes that appear in front of the vehicle as the vehicle moves, or the map data for performing the path-guiding.

In addition, at this point, the connection between the mobile terminal 100 and the in-vehicle image display apparatus 200 means the connected-car state where a mobile apparatus and a vehicle entertainment system (which includes the HUD, the projector, the dashboard of the vehicle, the display apparatus in the rear seat of the vehicle, and the like, which are described above, and which are pre-assumed to be collectively referred to as the "vehicle head-up unit") are connected to each other according to phone-to-car (P2C) service specifications prescribed by the Car Connectivity Consortium (shortened CCC).

When the "connected-car" state is entered in this manner, the mobile terminal 100 and the in-vehicle image display apparatus 200 exchange a screen, sound, and other items of data between them through the wireless communication unit 110.

In a state where the mobile terminal 100 and the in-vehicle image display apparatus 200 are connected to each other in this manner, a user tracking unit 120 of the mobile terminal 100 detects a direction of the driver's gaze that is within a predetermined range from the connected in-vehicle image display apparatus 200, for example, from the vehicle head-up unit and a display unit 151 of a main body.

For example, a controller 180 of the mobile terminal 100 analyzes an image of the driver that is obtained through the front camera provided in the vehicle or a camera provided in the mobile terminal 100 or the image display apparatus 200, and thus determines whether a driver's face points to a display of the in-vehicle image display apparatus 200, or whether the driver's eyes point to the front window of the vehicle, that is, whether the driver's gaze is fixed to in front of the vehicle. To do this, the controller 180 receives from the in-vehicle image display apparatus 200 the driver's image or a signal indicating whether or not the image of the driver or the driver's gaze is fixed to a display of the image display apparatus 200.

When it is determined that while a change in the driver's gaze is detected in this manner, an image sharing mode is entered, the controller 180 transmits an image displayed on the in-vehicle image display apparatus 200 (a "first image display apparatus"), for example, the external images of the scenes that appear in front of the vehicle, and an image displayed on the display unit 151, for example, an image in a web page screen, which corresponds to a direction of the driver's gaze, to a different image display apparatus 200b or 200c (a "second image display apparatus") that is connected, for example, the display apparatus in the rear seat or the terminal carried by the passenger.

At this time, when the driver's gaze is moved to a different display of the image display apparatus 200 or to the display unit 151 of the mobile terminal, the controller 180 changes the image displayed on the different image display apparatus 200b or 200c that is connected, that is, on the second image display apparatus, to an image that corresponds to a position to which the driver's gaze is turned, and then displays such an image.

When the image that corresponds to the driver's gaze is transmitted from the mobile terminal 100 to the second image display apparatus in this manner, a user of the second image display apparatus can performs predetermined inputting on the transmitted image. While transmitting an update image that results from including the input in the transmitted image, to the mobile terminal 100, the second image display apparatus transfers an image sharing request to the image display apparatus 200 that is connected to the mobile terminal 100. Then, the mobile terminal 100 transmits the received update image to the first image display apparatus that accepts the image sharing, through the wireless communication unit 110.

On the other hand, the second image display apparatus responds to the image sharing request transmitted from the mobile terminal 100 by displaying an expression of sharing acceptance or sharing refusal. When a sharing acceptance signal is received, the controller 180 transmits to the second image display apparatus an image that is displayed on a screen to which the driver's gaze points. When a sharing refusal signal is received, the controller 180 performs control in such a manner that a sharing refusal message is output to the display unit 151 of the mobile terminal 100 or to an audio output module 152. Accordingly, even though the different image display apparatus 200 in the vehicle refuses the image sharing request, the expression of the sharing refusal is displayed only on the driver's mobile terminal 100 and this does not interfere directly with the driver's driving.

As described above, the image that is viewed by the driver is shared in real time with the passenger in the vehicle, and thus a driver's movement that prevents continuance of attention is minimized particularly while driving the vehicle. This ensures safe driving and enables the driver to share the image with the passenger without a separate operation, thereby providing the driver with convenience.

A path-guiding application (program) that is provided from the mobile terminal, or a vehicle-mounted image display apparatus provides a function in which a current location of the user is grasped and a path from a current location to the user-input destination point is provided. The mobile terminal according to the present invention provides location information that the user already receives through his/her terminal, as a recommendation destination point, in order to make use of the location information as the destination point for the path-guiding function. That is, the mobile terminal according to the present invention extracts the location information using all data that the user provides or receives through his/her terminal and has a function of recommending such location information as the destination point. A specific control method according to the present invention is described below.

Figure 7:
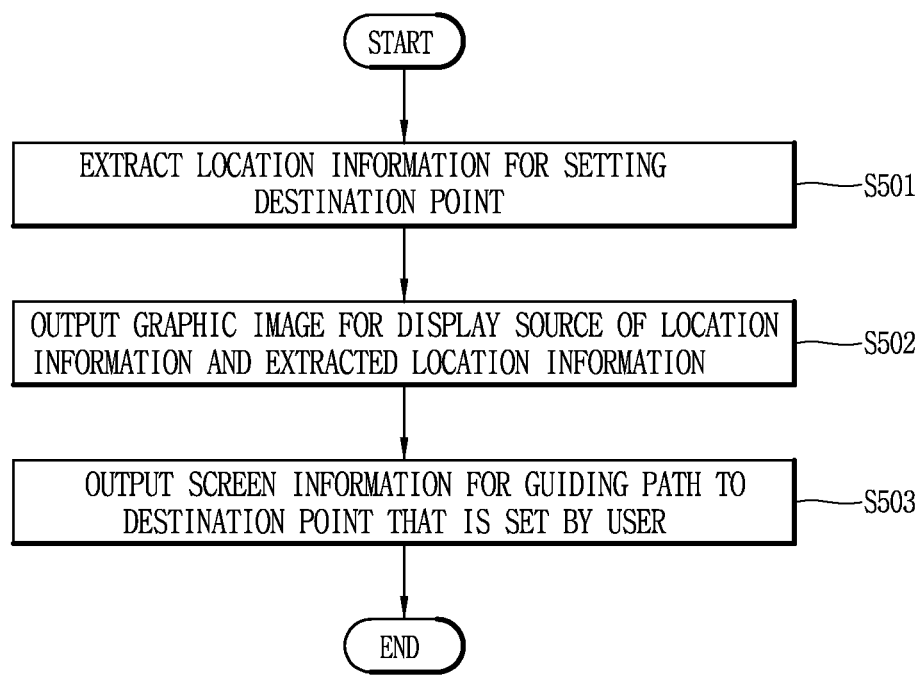
FIG. 7 is a flow chart for describing a method of controlling a terminal according to one embodiment of the present invention.
Figure 8A:
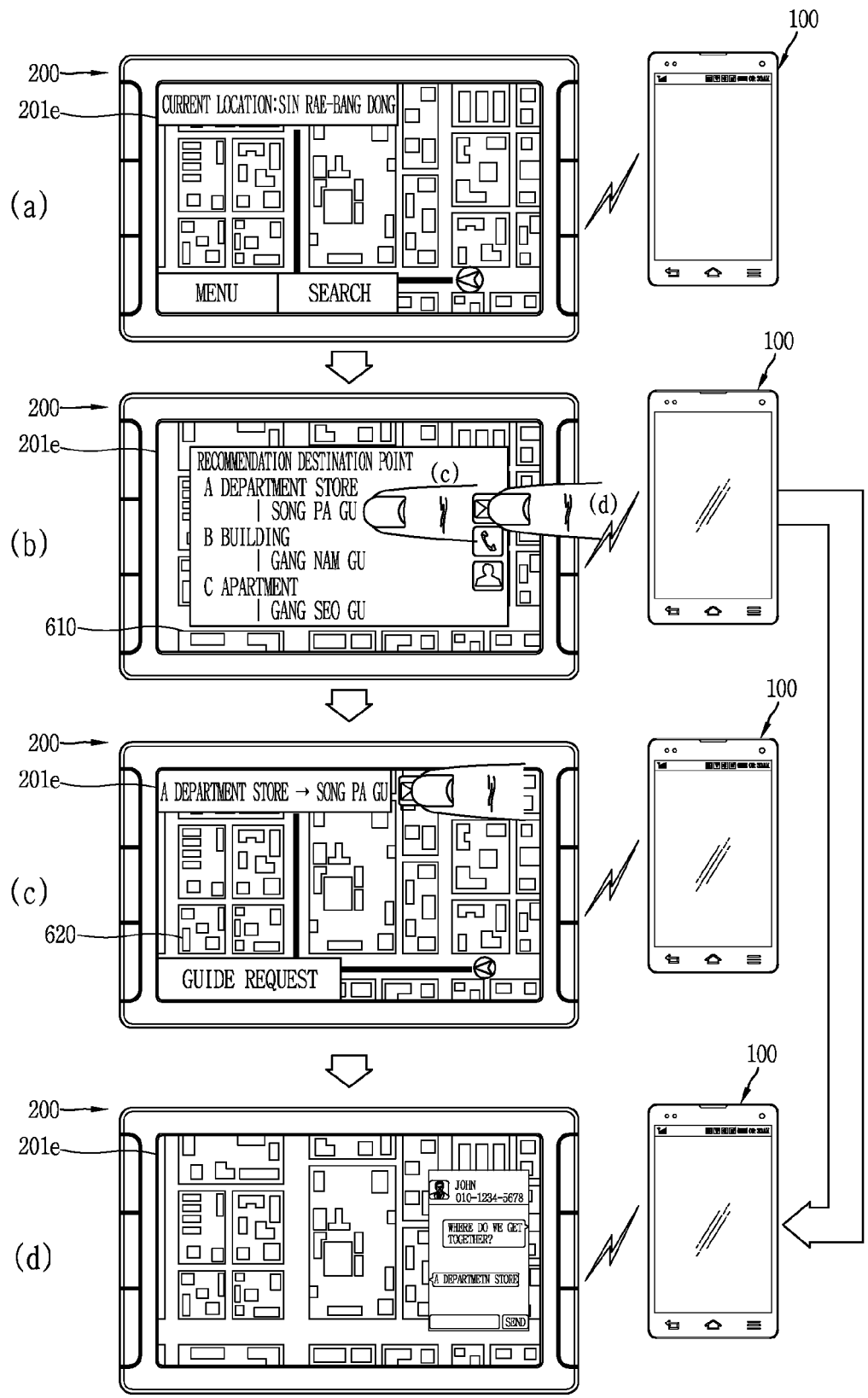
FIGS. 8A and 8B are diagrams for describing a method of controlling the mobile terminal according to one embodiment of the present invention.

FIG. 7 is a flow chart for describing a method of controlling the terminal according to one embodiment of the present invention. FIGS. 8A(a) to 8A(d) are diagrams for describing a method of controlling the mobile terminal according to one embodiment of the present invention. Referring to FIGS. 7 and 8A(a) to 8A(d), a method is described in which if the terminal is connected to an external terminal, the destination point is set using the location information that is extracted from an external terminal. The terminal according to the embodiment of the present invention corresponds to the in-vehicle image display apparatus 200, and the external terminal corresponds to the mobile terminal 100 that is connected to the image display apparatus 200 in a cable or wired or wireless manner.

The image display apparatus 200 and the mobile terminal 100 are connected to each other through a wireless communication unit 110. For example, the image display apparatus 200 and the mobile terminal 100 are connected to each other through a Wireless Fidelity (WiFi) transmission and reception unit or a Bluetooth transmission and reception unit in a "wireless" manner. However, this does not impose any limitation, and the image display apparatus 200 and the mobile terminal 100 may be connected to each other in a cable manner.

The image display apparatus 200 according to the embodiment of the present invention corresponds to the vehicle-mounted image display apparatus that is mounted in a vehicle-mounted state in order to be used. The vehicle-mounted image display apparatus includes the navigation session 300 (or the search unit) that generates the path-guiding information, based on the map data and the information on the current location of the vehicle and that notifies the driver of the generated path-guiding information.

In addition, at this point, the connection between the mobile terminal 100 and the in-vehicle image display apparatus 200 means the connected-car state where a mobile apparatus and a vehicle entertainment system (which includes the HUD, the projector, the dashboard of the vehicle, the display apparatus in the rear seat of the vehicle, and the like, which are described above, and which are pre-assumed to be collectively referred to as the "vehicle head-up unit") are connected to each other according to phone-to-car (P2C) service specifications prescribed by the Car Connectivity Consortium (shortened CCC).

When the "connected-car" state is entered in this manner, the mobile terminal 100 and the in-vehicle image display apparatus 200 exchange a screen, sound, and other items of data between them through the wireless communication unit 110.

For description convenience, the terminal according to the embodiment is hereinafter defined as the image display apparatus 200, and the external terminal is defined as an external terminal 100.

The terminal according to the present invention extracts the location information for designating the destination point. The controller 212 extracts the location information from items of data that are received from the mobile terminal 100. However, this does not impose any limitation, and when connected to the image display apparatus 200, may be controlled in such a manner that only item corresponding to the location information is transmitted to the image display apparatus 200.

At this point, the data corresponding to the location information is determined by the controller 212. For example, if the data corresponds to an address, a telephone number (numerals), a building name, district information, a street name or the like, the controller 212 recognizes these as the location information. In addition, the controller 212 analyzes contents included in the data and determines whether text, an image, or the like that is included in the data corresponds to the location information.

In addition, the location information is configured from various types of data, and for example, corresponds to text, an image, voice, a media file to which location-related content is tagged, or the like.

In order to designate the location information extracted from the mobile terminal 100 as the destination point, the location information and a graphic image for displaying a source of the location information are output (S602).

Referring to FIG. 8A(b), when the location information is extracted by the mobile terminal 100, a first pop-up window 500 that includes location information 510 and a graphic image 520 is output to the display unit 201e.

The first pop-up window 500 is output in a manner that is superimposed onto one screen information 610 in the image display apparatus, which is output to the display unit 201*e*. However, this does not impose any limitation, and the controller 212 controls the display unit 201*e* in such a manner that destination point recommendation screen information including the location information 510 and the graphic image 520 is output on the display unit 201*e*.

The controller 212 controls the display unit in such a manner that at least one item of information, among the items of location information 510 that are extracted from the data included in the mobile terminal 100, is output to the first pop-up window 500. For example, the controller 212 controls the display unit 201*e* in such a manner that items of location information that is selected from among the extracted items of location information 510 according to a predetermined reference are output in a way that is arranged in a row.

The controller 212 extracts the location information according to the connection of the mobile terminal 100 and the image display apparatus 200 and controls the display unit 201*e* in such a manner that the location information is output, but this does not impose any limitation. For example, an icon to which a control command for fetching the location information from the mobile terminal 100 is applied is output to the display unit 201*e*. That is, as one menu for controlling such a function, the image display apparatus 200 includes a menu for performing a function of receiving information from the mobile terminal 100 (the external terminal).

The controller 212 searches for additional information corresponding to the location information, based on the extracted location information. For example, if the location information corresponds to one portion of an address, the controller 212 searches for a district name corresponding to the address. Alternatively, if the location information corresponds to the district name, the controller 212 searches for the address that is matched with the district name and outputs the result. For example, if the extracted location information includes a building name and a telephone number, the controller 212 searches for a building address corresponding to the telephone number and outputs the result.

The location information 510 includes a name 511 of a location that can be designated as the destination point and an address 512 of such a location. The name 511 corresponds to a representative district name, a building name, a geographical name, or the like. In addition, the controller 212 estimates details of the location information 510 using data corresponding to a source from which the location information is extracted.

Referring to FIG. 8A(c), the controller 212 designates the location information 510 as the destination point, based on a touch input that is applied to the display unit 201*e* to which the location information 510 is output. The controller 212 controls the display unit 201*e* in such a manner that a guide screen 620 that provides the path-guiding until the user arrives at the location information 510, based on the current location and the location information 510 (S603).

The location information 510 includes not only data (for example, a user-stored schedule) that is created by the user and is intentionally stored, but also information that is received from the other party and data that is temporally provided to the user.

Although not specifically illustrated, when one item of location information is selected based on the user's touch input, the controller 212 controls the display unit 201*e* in such a manner that a map screen on which the location information is displayed is output and thus the location information in the form of an image is provided to the user.

According to the embodiment of the present invention, a source of the location information displayed on the display unit 201*e* indicates a storage space in the memory 169 of the mobile terminal, in which the location information is stored. For example, the source corresponds to an application that corresponds to a storage space in which the location information was stored, or a source (for example, information on the external terminal, a program that is used to transmit the location information, information on a web site in which the location information is stored, or the like) from which the location information is transmitted to the mobile terminal.

For example, the graphic image 520 corresponds to an icon for the application that corresponds to the storage space in which the location information was stored. Referring to FIG. 8A(b), the location information 510 extracted from the data that is received from the external terminal in which the mobile terminal 100 is stored under the name of John, or that is transmitted to the external terminal is output to the display unit 201*e*. The mobile terminal 100 provides the user with the location information 510 through a display unit 152 of the mobile terminal 100, using a message application that is activated.

The controller 212 receives information on the message application, data provided through the application, and the location information from the mobile terminal 100. In addition, the controller 212 controls the display unit 201*e* in such a manner that an icon corresponding to the application is output along with the location information 510.

With the graphic image, the user can recognize which application is being executed when the location information occurs and is stored. This helps designate the location information as the destination point.

However, the method of displaying for the user the source from which the location information is extracted is not limited to this. For example, the graphic image is configured from text that alerts the user to the information on the application. Furthermore, one portion of the data representing the location information is output to the display unit 201*e*, and thus the source of the location information is provided to the user. For example, one portion of contents of a text message including the location information is output to the display unit 201*e*.

With the touch input that is applied to a graphic image 620, the controller 212 controls the display unit 201*e* in such a manner that an execution screen of the application is output based on the information on the application that is received from the mobile terminal 100.

The controller 212 controls the display unit 201*e* in such a manner that the execution screen of the application that is output on the display unit 151 of the mobile terminal 100 and that includes the data representing the location information is output. Referring to FIG. 8A(d), the controller controls display unit 201*e* in such a manner that an execution screen 630 of a text message application including the location information 510 is output.

The controller 212 controls the display unit 201*e* in such a manner that a pop-up window is output on the screen information 610 in a way that is superimposed onto the screen information 610 and the execution screen 630 is displayed on the pop-up window.

In addition, the controller 212 controls functions of the text message application, based on the touch input that is applied to the display unit 201*e* to which an execution screen 530 is output. For example, when the execution screen 630 including messages that are transmitted to and received from John is output based on the touch input that is applied to the graphic image 520, based on touch input that is applied to the display unit 201*e*, the controller 212 control the functions of the application that is installed in the mobile terminal, in such a manner that text is input into an input window or a message is transmitted.

Furthermore, based on the touch input that is applied to the graphic image 520, the controller 212 controls not only the transmitted location information and one portion of the data, but also the mobile terminal 100 in a manner that operates with the mobile terminal 100. That is, the controller 212 may control the display unit 201e in such a manner that screen information corresponding to the application, as well as the execution screen including the location information 510, is output.

Referring to FIG. 8A(c), a destination point that is set by the user is displayed on the guide screen 620, and if the destination point is selected using the extracted location information, the controller 212 controls the display unit 201e in such a manner that the graphic image 520 is displayed on the guide screen 620.

In addition, based on the touch input that is applied to the graphic image 520 displayed on the guide screen 620, the controller 212 controls the display unit 201e in such a manner that the execution screen 630 is output. According to the present invention, the user can set the destination point more easily using the location information that is extracted from the data that is stored in the connected mobile terminal (that is, the external terminal). Accordingly, the user does not separately need to input an address of the destination point or search for a location and can be provided back with the location information, which have been forgotten.

In addition, returning to a state in which the location information takes place by displaying the source from which the location information is extracted, and the desired destination point is accordingly easily set and control is partially performed on the source. Thus, the location information that is provided while guiding the path to the destination point is used in a more diverse manner.

Figure 8B:
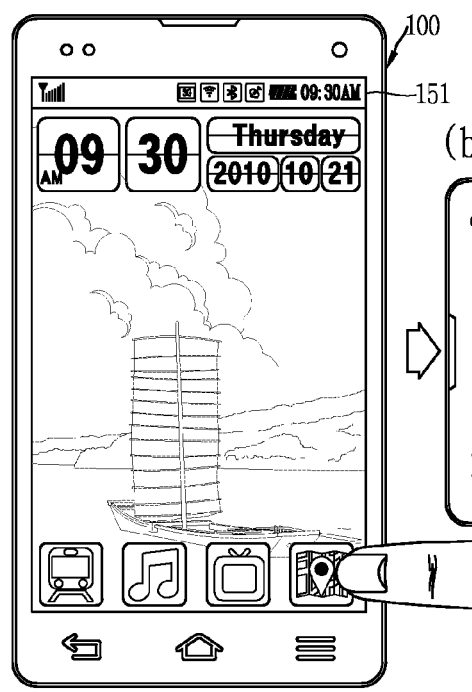
Figure 8B:
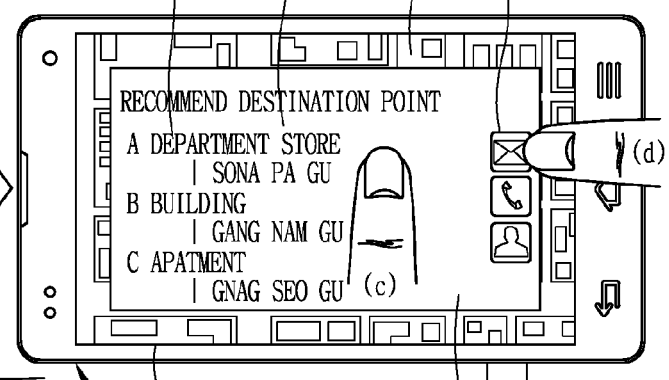
Figure 8B:
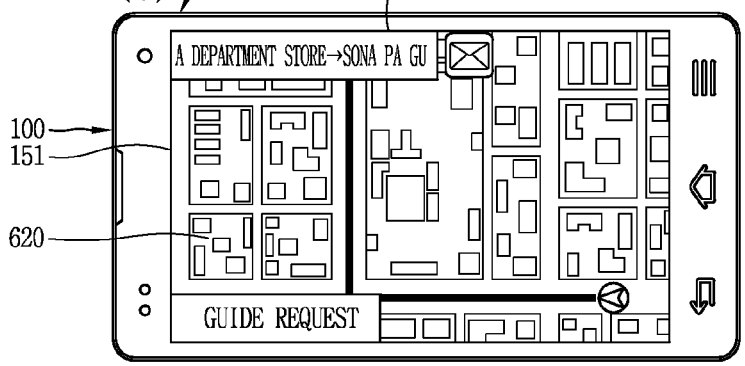
Figure 8B:
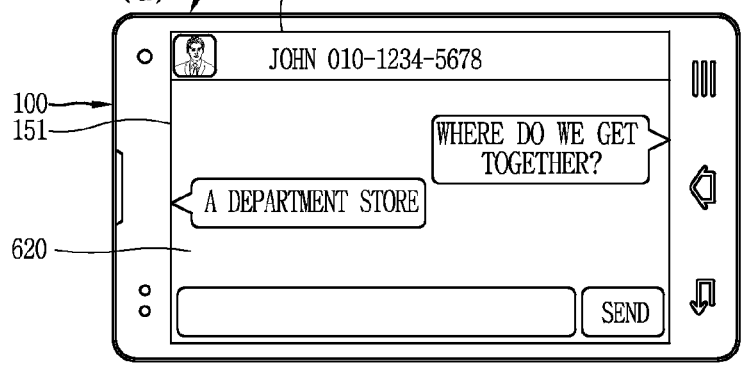

Referring to FIGS. 8B(a) to 8B(d), a control method is described in which a path-guiding application is executed based on the location information that is extracted from the same terminal. Referring to FIGS. 8A(a) to 8A(d) and 8B(a) to 8B(d), a function that is performed by the image display apparatus 200 is substantially the same as a function that is performed by a path-guiding application according to the present embodiment, and screen information based on the function performed by the image display apparatus 200 is substantially the same as screen information that is based on the function performed by a path-guiding application according to the present embodiment.

In addition, control steps in FIGS. 8B(a) to 8B(d) are substantially the same as described referring to FIGS. 8A(a) to 8A(d) except that the functions are performed by one terminal. According, the description that is provided referring to FIGS. 8A(a) to 8A(d) substitutes for the redundant description.

Referring to FIGS. 8B(a) and 8B(b), based on the touch input that is applied to an icon corresponding to the path-guiding application, the controller 212 executes the path-guiding application. The display unit 151 of the mobile terminal 100 outputs the screen information 610 of the path-guiding application.

When the path-guiding application is executed, an extraction unit (not illustrated) of the controller 180 of the mobile terminal 100 extracts the location information from the data that is stored in the memory 160.

However, this does not impose any limitation, and if the mobile terminal 100 and the external terminal (not illustrated), the controller 180 extracts the location information from the data that is stored in the external terminal (not illustrated) and provides the user with the extracted location information.

The location information 510 includes the name 511 of the location and the address 512 of the location. The controller 180 searches for the additional information, based on the location information extracted from the data.

The display unit 151 outputs the first pop-up window 500 that includes the location information 510 extracted by the extraction unit and a graphic image 530 corresponding to a source of the location information 510. The first pop-up window 500 is output to the screen information 610 in a manner that is superimposed onto the screen information 610.

Referring to FIGS. 8B(b) and 8B(c), the controller 180 sets the destination point with the touch input that is applied to the location information 510, and controls the display unit 151 in such a manner that the guide screen 620 which guides the path to the destination point is output.

On the other hand, based on the touch input that is applied to the graphic image 520, the controller 180 controls the display unit 151 in such a manner that an execution screen 631 of an application corresponding to the source is output. The execution screen 631 includes the data from which the location information is extracted.

The controller 180 controls the display unit 151 in such a manner that the screen information 610 is switched to the execution screen 631. In this case, the user can an function of the application corresponding to the source by applying the control command to the mobile terminal 100.

On the other hand, as illustrated in FIGS. 8B(c) and 8B(d), the guide screen 620 including the address of the destination point and the like and the graphic image 520 corresponding to the source is output to the display unit 151. Accordingly, the user can identify the source of the location information 510 using the graphic image 520 even after the setting of the destination point is completed and the guiding starts.

Accordingly, when the path-guiding application is executed, with operation of the mobile terminal, the user can set the destination point more conveniently using the stored data.

FIGS. 9A(a) to 9A(d) and 9B(a) to 9B(c) are diagrams for describing a control method in which while the path-guiding function is performed, an function of an application is controlled on an execution screen.

Referring to FIGS. 9A(a) to 9A(d), the image display apparatus 200 that is connected to the mobile terminal 100 outputs the execution screen 631 of an application corresponding to the source while a path-guiding function is performed. Unlike in the case of the method illustrated in FIGS. 8A(a) to 8A(d), the execution screen 631 of the application is entirely output to the display unit 102e without outputting the pop-up window including the execution screen.

Referring to FIGS. 9A(a) and 9A(b), the execution screen 631 of the message application is output to the display unit 201e, and the execution screen 631 includes the extracted location information 510. Based on the user-applied control command, the controller 212 performs control in such a manner that text is input, and performs a function of transmitting the text to the external terminal.

On the other hand, referring to FIGS. 9A(b) and 9A(c), a switch icon 632 is output to the display unit 201e in a manner that is superimposed onto the execution screen 631. Based on the touch input that is applied to the switch icon 632, the controller 212 controls the display unit 201e in such a manner that the execution screen 631 is switched to the guide screen 620.

Accordingly, the user can identify the source of the data from which the destination point that is set or is to be set is extracted and can be easily provided with a guide screen.

If the present invention is realized using one terminal (refer to FIGS. 8B(a) to 8B(d)), the inactivated path-guiding application is activated to switch the execution screen of the source back to the guide screen. However, this does not impose any limitation, and as illustrated in FIGS. 9A(a) to 9A(d), if the path-guiding application is being executed without being terminated, a switch icon for activating the path-guiding application and outputting the guide screen is output to the display unit 151.

Figure 9B:
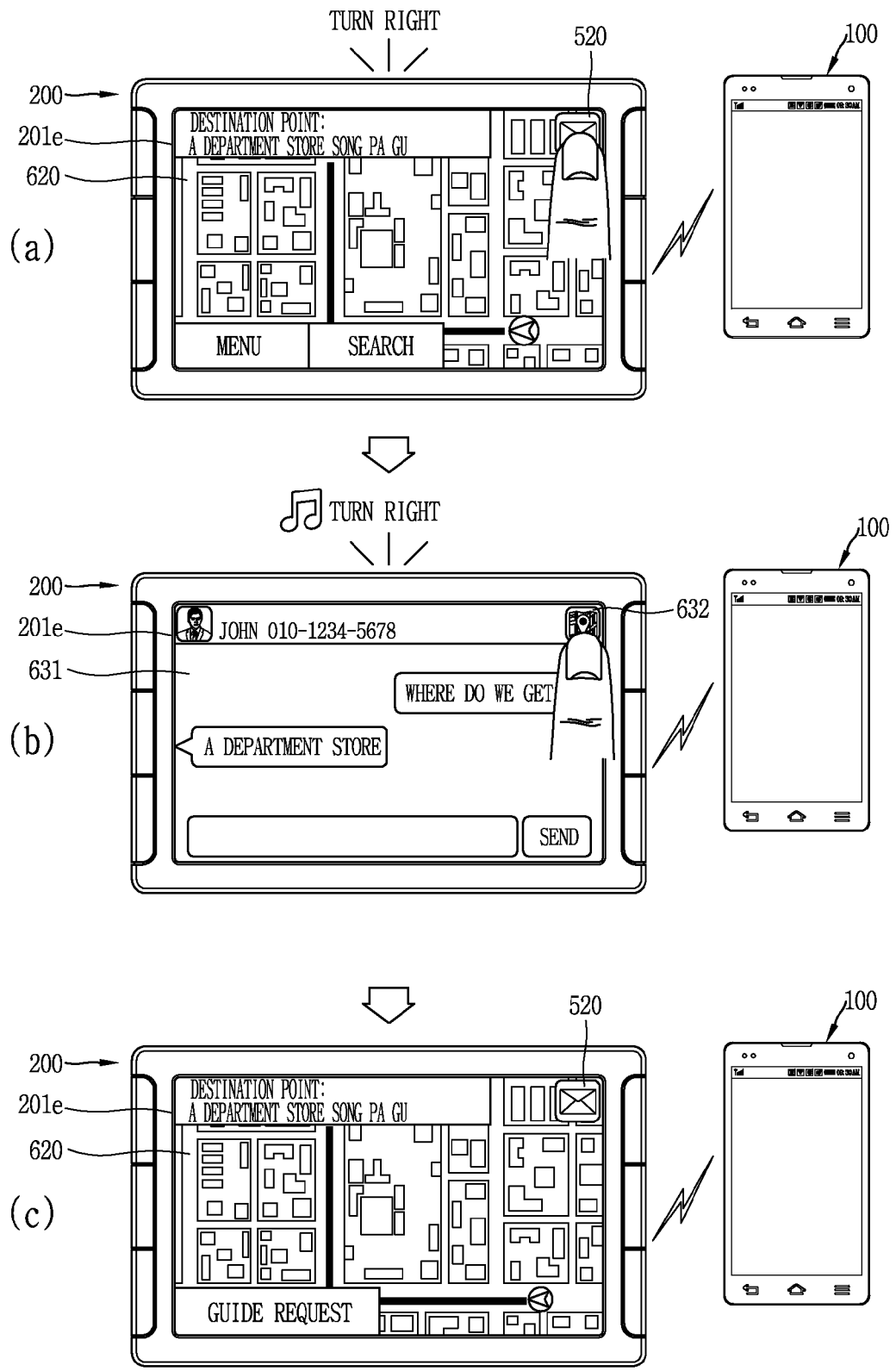

A method of controlling the inactivated path-guiding function while outputting the execution screen is described referring to FIGS. 9B(a) to 9B(c). When the path-guiding function is performed, with a user's setting, the controller 212 controls the display unit 201e in such a manner that the guide screen 620 is output and controls the voice output unit 226 in such a manner that a guide voice is output.

If the guide screen 620 is switched to the execution screen 631 by the user, based on the moving of the vehicle and an external environment being detected, the controller 212 controls the voice output unit 226 in such a manner that the guide voice continues to be output.

Accordingly, the user can be continuously provided with the guide based on the moving of the vehicle even while the source of the destination point being set is being identified.

Figure 10A:
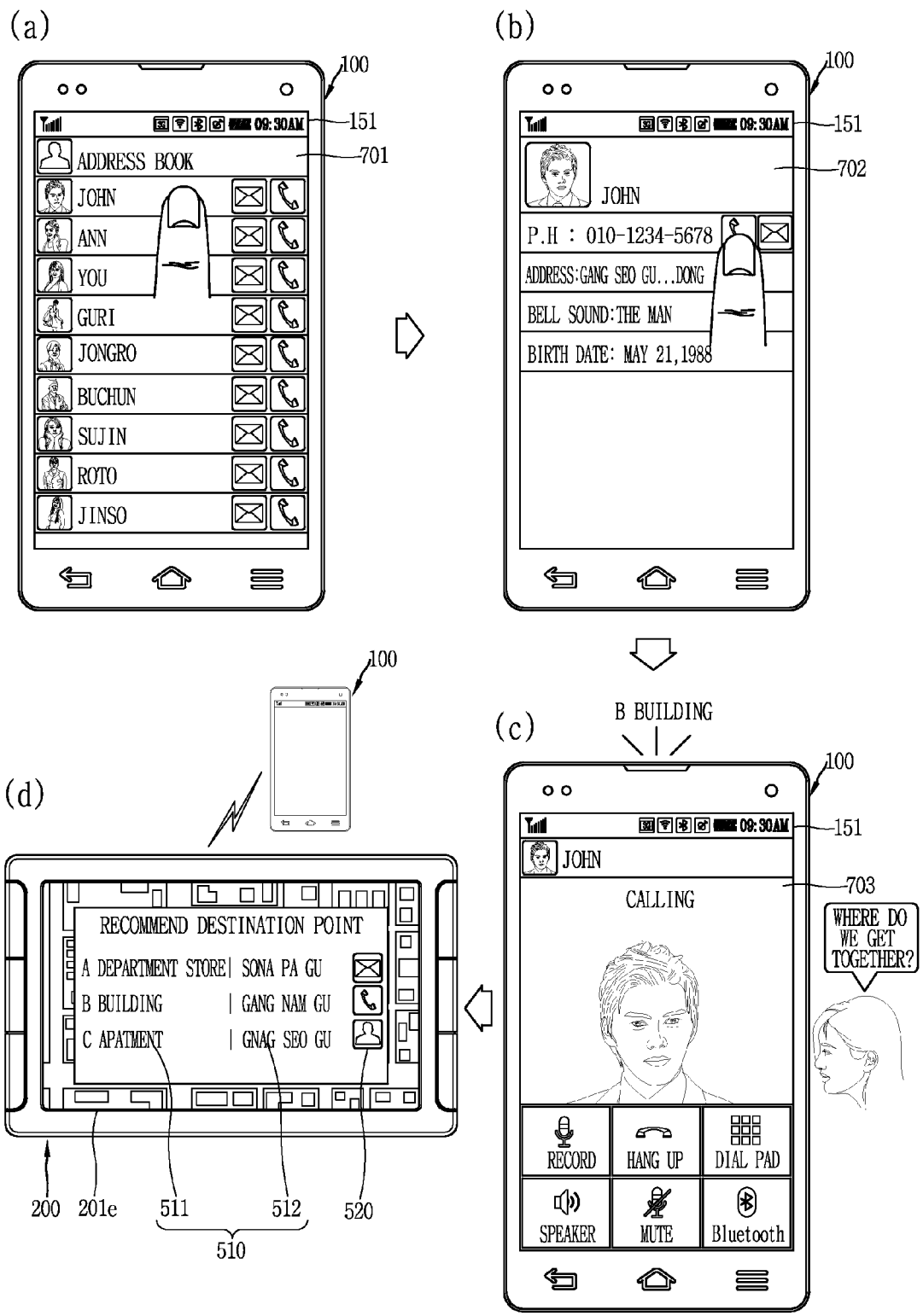
FIGS. 10A, 10B and 10C are diagrams for describing location information that is extracted from various sources.

FIGS. 10A(a) to 10A(d), 10B(a) to 10B(c), and 10C(a) to 10C(a) to 10C(c) are diagrams for describing the location information that is extracted from various sources.

Referring to FIGS. 10A(a) to 10A(d), a control method is described in which the location information is extracted from the data being generated in a communication mode using the mobile terminal.

FIG. 10A(a) illustrates an execution screen 701 of an address book application that includes information on the external terminal that is stored by the user. FIG. 10A(b) illustrates low-level screen information 702 that includes low-level data on the external terminal that is selected by the user from the execution screen 701 of the address book application.

The low-level screen information 702 includes a representative name, a representative image, and a telephone number of the selected external terminal, and an address (a place of residence, an office, and the like) of the user of the external terminal.

Referring to FIG. 10A(c), the controller 180 activates the communication mode using an icon for placing a call to the external terminal, which is included in the low-level screen information 702. In the communication mode, a communication screen 703 is output to the display unit 151. In the communication mode, the microphone 122 receives a voice of the user, and the sound output unit 154 outputs a voice of the other party.

The controller 180 controls the memory 160 in such a manner that data on the voice of the user and the voice of the other party is stored. For example, the controller 180 controls the memory 160 in such a manner that contents of the voice, if they include the location information, are stored.

In this case, the controller 180 controls the memory 160 in such a manner that the voice in the communication mode is stored for a predetermined period of time.

On the other hand, if a function of communicating with the external terminal is performed through the wireless communication unit 110, the extraction unit of the controller 212 extracts the location information from the related data in order to activate the communication mode.

For example, in the communication mode, the extraction unit extracts the location information from the voice that is input into the mobile terminal 100 or is output by the mobile terminal 100. For example, if the voice includes an address, a telephone number, or a word corresponding to a district name or words, such as "where" and "place," the location information included in the voice is extracted.

In addition, the extraction unit extracts from the memory 160 of the mobile terminal 100 information on the external terminal that is connected while the communication mode is activated. For example, as illustrated in FIG. 10A(b), if the address is included in the information relating to the external wirelessly-connected terminal, the address is extracted and provided as the location information.

For example, if a telephone number of the external terminal connected in the communication mode includes an area code or is a number that is registered to correspond to a specific location, if a different telephone number is stored in the external terminal along with a representative number, a location of the external terminal is searched for using these, and the resulting location is provided as the location information.

Referring to FIG. 10A(d), the controller 212 of the image display apparatus 200 controls the display unit 201e in such a manner that the location information extracted from the data relating to the external terminal that is connected while the communication mode is being activated is displayed.

On the other hand, the controller 212 converts the voice into text and displays the text on the display unit 201e. That is, in order for the data to be provided as the location information, the data in which the location information is included is not limited to the visual information, and all information that is recognized as the location-related data by the extraction unit is used as the location information.

Figure 10B:
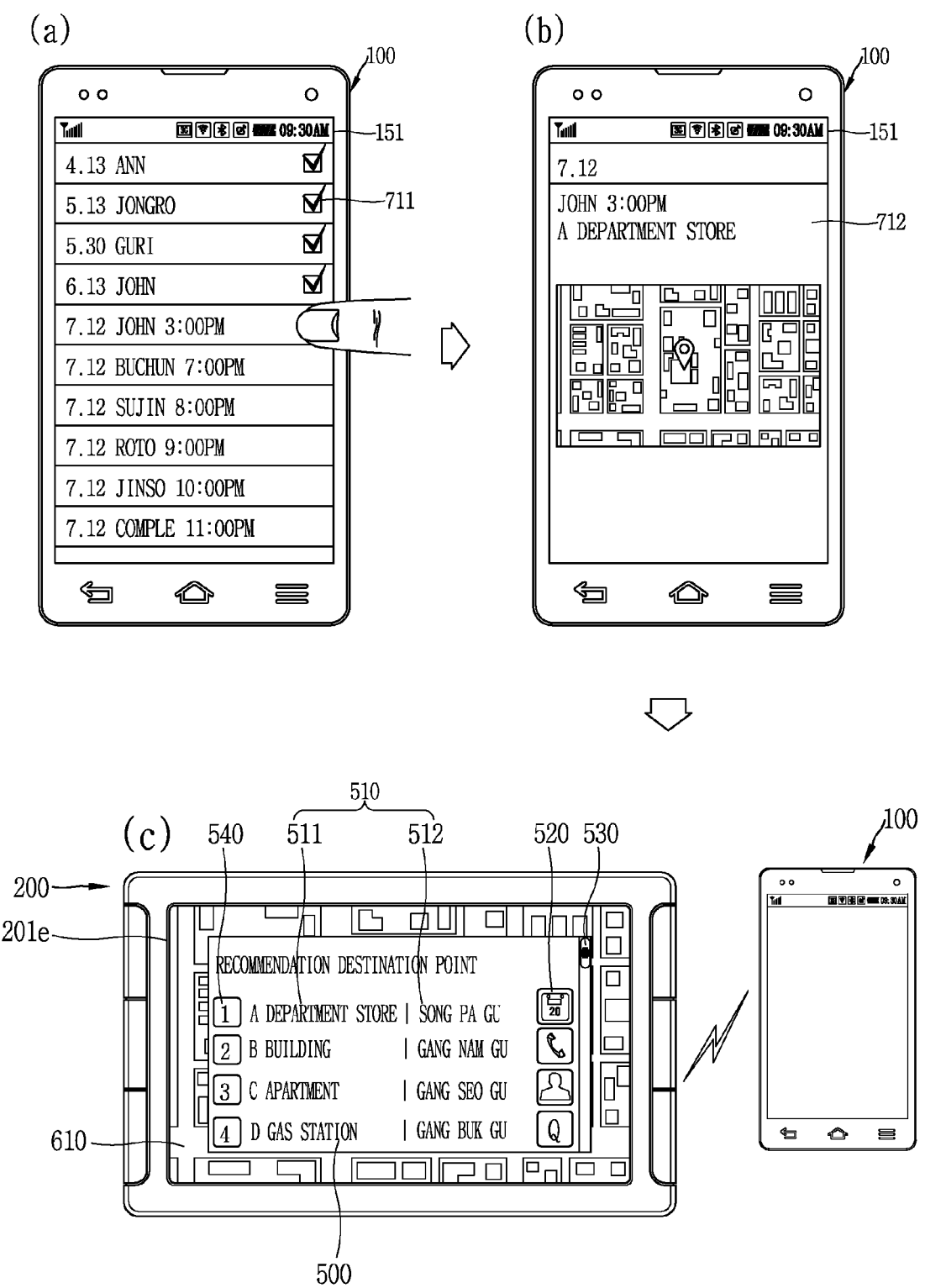

A control method of providing the location information according to another embodiment is described referring to FIGS. 10B(a) to 10B(c).

FIG. 10B(a) illustrates an execution screen 711 of a scheduling application, to which planned items stored by the user are output. The execution screen 711 includes the planned items that are stored in the memory 160 by the user. For example, the execution screen 711 includes schedule information that includes a date, time, a subject, a representative name of the mobile terminal that is included in an address book, and the like.

Detailed information 712 on one planned item that is selected by the user from among the planned items included in the execution screen 711 is output is output to the display unit 151. For example, the detailed information 712 includes a date, time, a subject, a representative name of the external terminal that is included in an address book, an appointment place, an address of the appointment place, a map of the appointment place, and the like.

Referring to FIG. 10B(c), the controller 212 controls the display unit 201e in such a manner that the location information extracted from schedule information recorded by the user is output.

On the other hand, the controller 212 arranges the extracted pieces of location information sequentially according to a predetermined reference. There is no limit to the predetermined reference and the user can arbitrary set the predetermined reference. For example, the reference is defined as the order in which the pieces of location information occur or are stored. That is, the controller 212 first outputs the location information that is extracted from the data that is most recently received or stored through the mobile terminal. Alternatively, the controller 212 performs control in such a manner that the location information that is intentionally stored, as the data arranged in chronological order, by the user, for example, the location information extracted from the data that is stored using the scheduling application, is first output. In addition, the controller 212 performs control in such a manner that the location information that is most closest to current time, of the pieces of location information that are extracted from the schedule information, is first output. Alternatively the controller 212 performs control in such a manner that the location information corresponding to an area that is most remotest from a current location or is most nearest to the current location is first output. Alternatively, the pieces of location information that are extracted from the data are arranged in a row in the increasing order of the accuracy.

The controller 212 controls the display unit 201e in such a manner that the location information 510 is displayed along with recommendation ranking 640. That is, the controller 212 arranges the pieces of location information in a row according to a predetermined reference and sequentially provides the user with the pieces of location information.

On the other hand, the controller 212 provides the user with a predetermined number of the pieces of location information. In this case, if all the pieces of location information are not output to the display unit 201e, a scroll bar 530 for applying the touch input to switch a screen is further output to the display unit 201e. Accordingly, the user can be provided the multiple pieces of location information that are sequentially arranged.

Accordingly, the location information that is suitable, at a current state, for the user is first provided to the user.

Figure 10C:
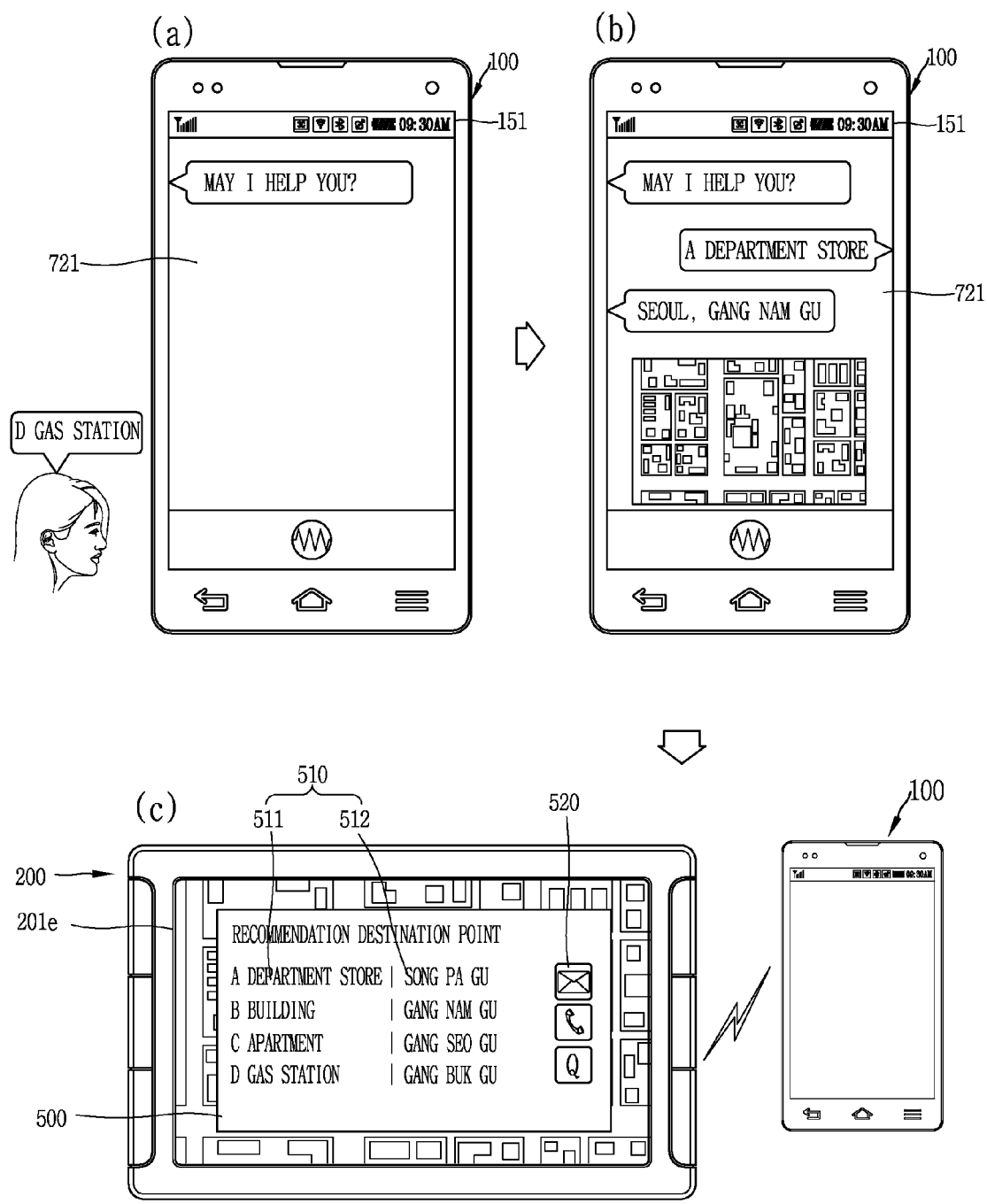

Referring to FIGS. 10C(a) to 10C(c), a control method is described in which the location information included in the data that occurs while performing a voice recognition function is provided. FIG. 10C(a) illustrates an execution screen 721 of the voice recognition function on the mobile terminal 100. Referring to FIGS. 10C(a) and 10C(b), the controller 180 of the mobile terminal 100 provides information based on the voice of the user that is input through the microphone 122, through the display unit 151 and the audio output module 152.

For example, the controller 180 controls the display unit 151 in such a manner that time data that results from converting the voice of the user into text is output. In addition, the controller 180 controls the display unit 151 in such a manner that information based on the voice is output in the form of text or in the form of an image, and the information is transferred as audio data.

As illustrated in FIG. 10C(a), the voice that is input by the user includes a name of a location (D gas station), and in response to the voice, the controller 180 controls the display unit 151 in such a manner that a map image including an address and address information which correspond to the name of the location is output.

The pieces of information included in the execution screen 721 are temporarily stored in the memory 160, or some of the pieces of information are stored in the memory 160.

With the voice recognition function, the extract unit of the image display apparatus 200 extracts the location information from the data that is input and output through the mobile terminal 100. For example, if information included in the execution screen 721 is stored in the memory 160, the extraction unit extracts the location information from the data that is stored in the memory 160. However, this does not impose any limitation, and if the information included in the execution screen 721 is not stored, the extraction unit is controlled in such a manner to extract the location information while the voice recognition function is currently performed by the mobile terminal.

Referring to FIG. 10C(c), the controller 212 performs control in such a manner that the location information that is input or output through the mobile terminal while the voice recognition function is performed is output to the display unit 201e.

As described above, the extraction unit of the image display apparatus extracts the location information that is output or input by the user while various functions are performed through the mobile terminal. In addition, the data including the location information is not limited to the embodiments described above.

On the other hand, although the path-guiding function is realized through an application on the mobile terminal, the location information is extracted from various sources through the mobile terminal.

FIGS. 11A(a) and 11A(b) and 11B(a) and 11B(b) are diagrams for describing a control method of outputting some of the multiple extracted pieces of location information. The multiple pieces of location information are extracted through the mobile terminal, and some of the multiple pieces of location information are output to the display unit 201e. In this case, the user can arrange, in a row, the pieces of location information belonging to one category, and outputs the arranged pieces of location information.

Referring to FIGS. 11A(a) and 11A(b), a control method of outputting the location information extracted from the same source is described. Referring to FIG. 11A(a), the location information 510 and the graphic image 520 corresponding to the source of the location information are output to the display unit 201e.

Based on the touch input that is applied to one graphic image 520, the controller 212 controls the display unit 201e in such a manner that at least one location information 510 extracted from the selected source is output. For example, if the graphic image (that is, a graphic image that corresponds to an icon for the message application) that is displayed along with the location information that is stored in a storage space for the message application by the user, the location information 510 that is extracted from the storage space for the message application is output.

At this point, it is preferable that the touch input be distinguished from the touch input that is applied to the graphic image in order to display the source. For instance, the touch input according to the present embodiment corresponds to a long touch input type that is applied for a predetermined time (several seconds).

Accordingly, the user can be provided with the location information extracted from the same source together.

Figure 11B:
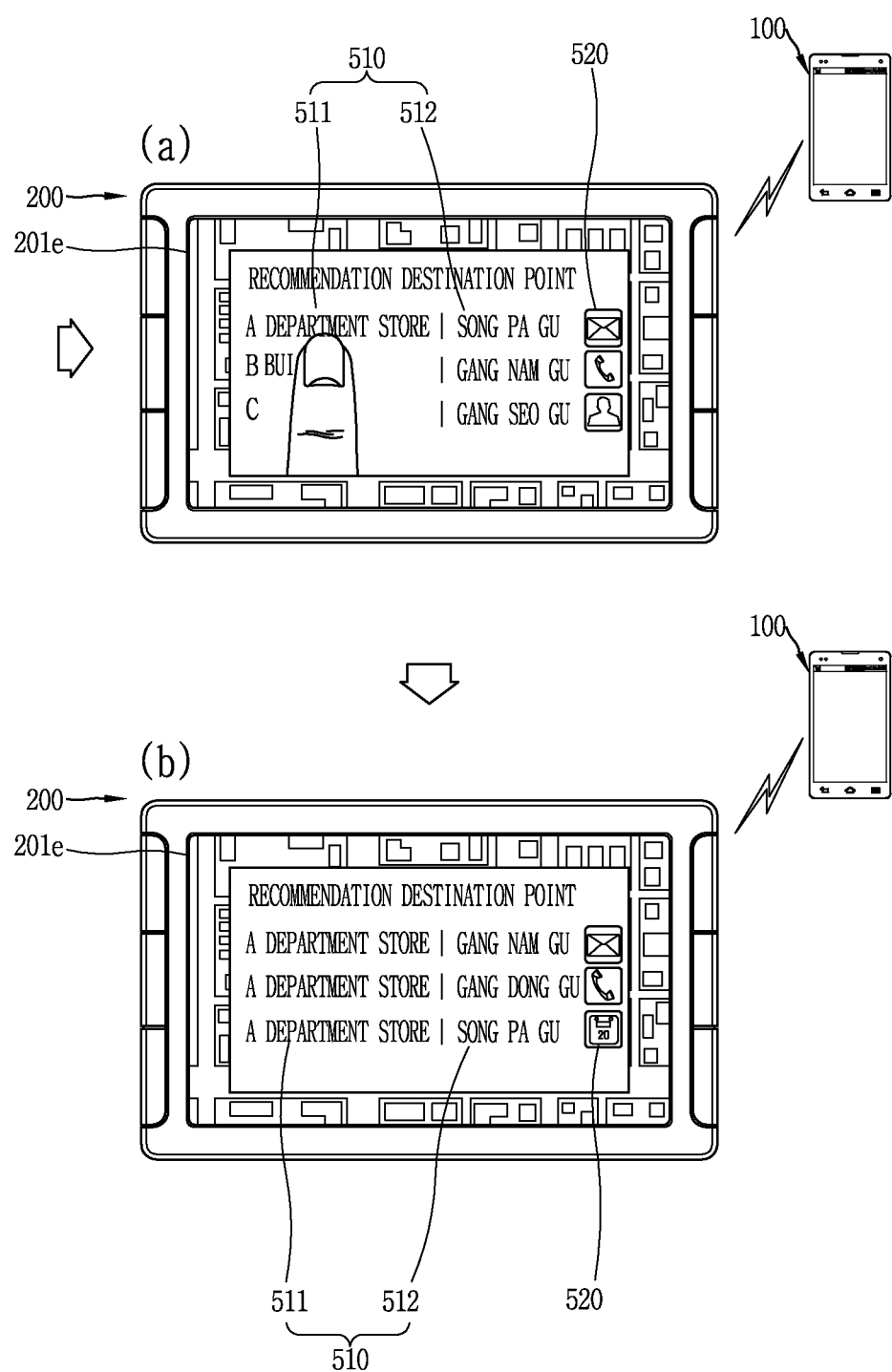

A control method of outputting the location information on the same area is described referring to FIGS. 11B(a) and 11B(b). Based on the touch input that among the pieces of location information 510, is applied to the name 511 of the location, the controller 212 controls the display unit 201e in such a manner that at least one piece of location information including the name of the same location is output.

For example, the different pieces of location information that include the name 511 of the same location are different from one another in terms of the sources from which they are extracted or are different in terms of the addresses to which they are related. Accordingly, the user can designate any one of the multiple addresses that have the same name but correspond to different areas, respectively, as the exact destination point.

In addition, although not illustrated, the user can be provided back with the data including the location information, in a state where the source from which the selected name is extracted is displayed.

Figure 12A:
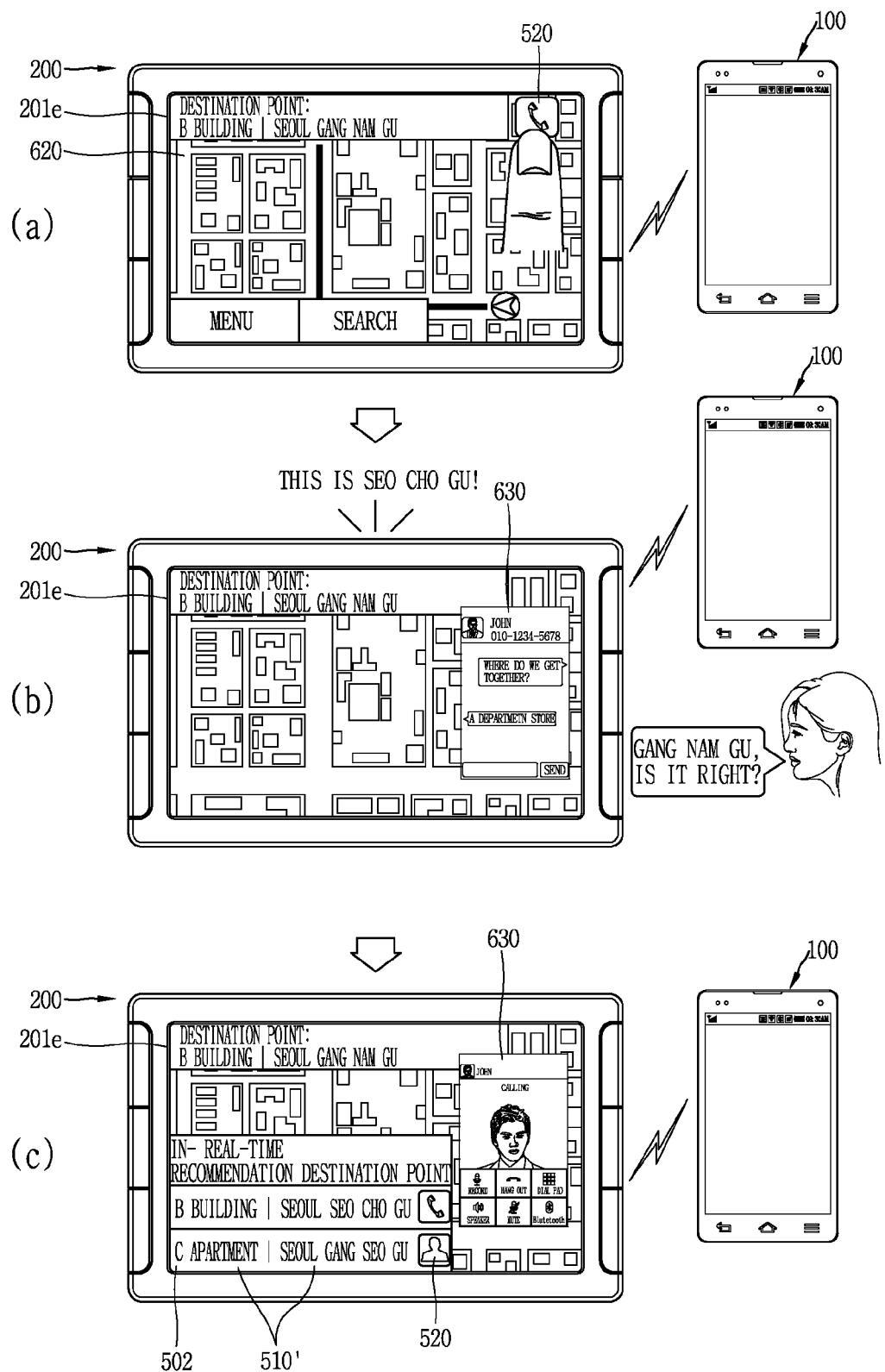
FIGS. 12A, 12B, 12C, and 12D are diagrams for describing a control method of providing the location information that is extracted in real time according to each embodiment.

FIGS. 12A(a) to 12A(c), 12B(a) to 12B(c), 12C(a) and 12C(b), and 12D(a) to 12D(c) are diagrams for describing a control method of providing the location information that is extracted in real time according to each embodiment.

Referring to FIG. 12A(a) to 12A(c), a control method of providing the in-real-time location information that is extracted during the communication with the external terminal while the path-guiding function is performed is described. Referring to FIGS. 12A(a) and 12A(b), destination point information that is set using the location information, and the switch icon 632 corresponding to the source of the location information are output on the guide screen 620 on the display unit 201*e*.

Based on the touch input that is applied to the switch icon 632 corresponding to the communication mode, the controller 212 places a call to the external terminal that is wirelessly connected to the mobile terminal 100 in the communication mode in which the location information is applied. That is, the user can place a call to the other party by applying the touch input to the switch icon 632.

When the switching to the communication mode is made through the switch icon 632, the execution screen 630 of a communication application is output to the display unit 201*e*. The execution screen 630 is output along with the guide screen 620, and the path-guiding continues to be performed.

The user can communicate with the user of the external terminal that is connected while the path-guiding function is performed. In this case, the voice is input and output through the image display apparatus 200.

The extraction unit extracts the location information from the data that is input and output through the image display apparatus 200 in a state where the communication mode is activated, Referring to FIG. 12A(c), the controller 212 controls the display unit 201*e* in such a manner that in-real-time location information 510' that is extracted from the data that occurs in the communication mode is output. For example, a second pop-up window 502 is output to the display unit 201*e* in a manner that is superimposed onto the guide screen 520, and the in-real-time location information 510' is displayed on the second pop-up window 502.

In addition, the graphic image 520 is output together to the display unit 201*e*. The graphic image 520 is for displaying the source from which the in-real-time location information 510' is extracted, along with the in-real-time location information 510'.

Although not specifically in the drawings, the controller 212 may change the destination point, based on the touch input that is applied to the in-real-time location information 510' that is output.

Accordingly, the user can perform the function of the mobile terminal that corresponds to the source of the destination point through the switch icon while the path-guiding function is performed and can be provided in real time with the location information that occurs by performing the function.

Accordingly, the destination point is easily changed according to what occurs to the driver while driving the vehicle.

Figure 12B:
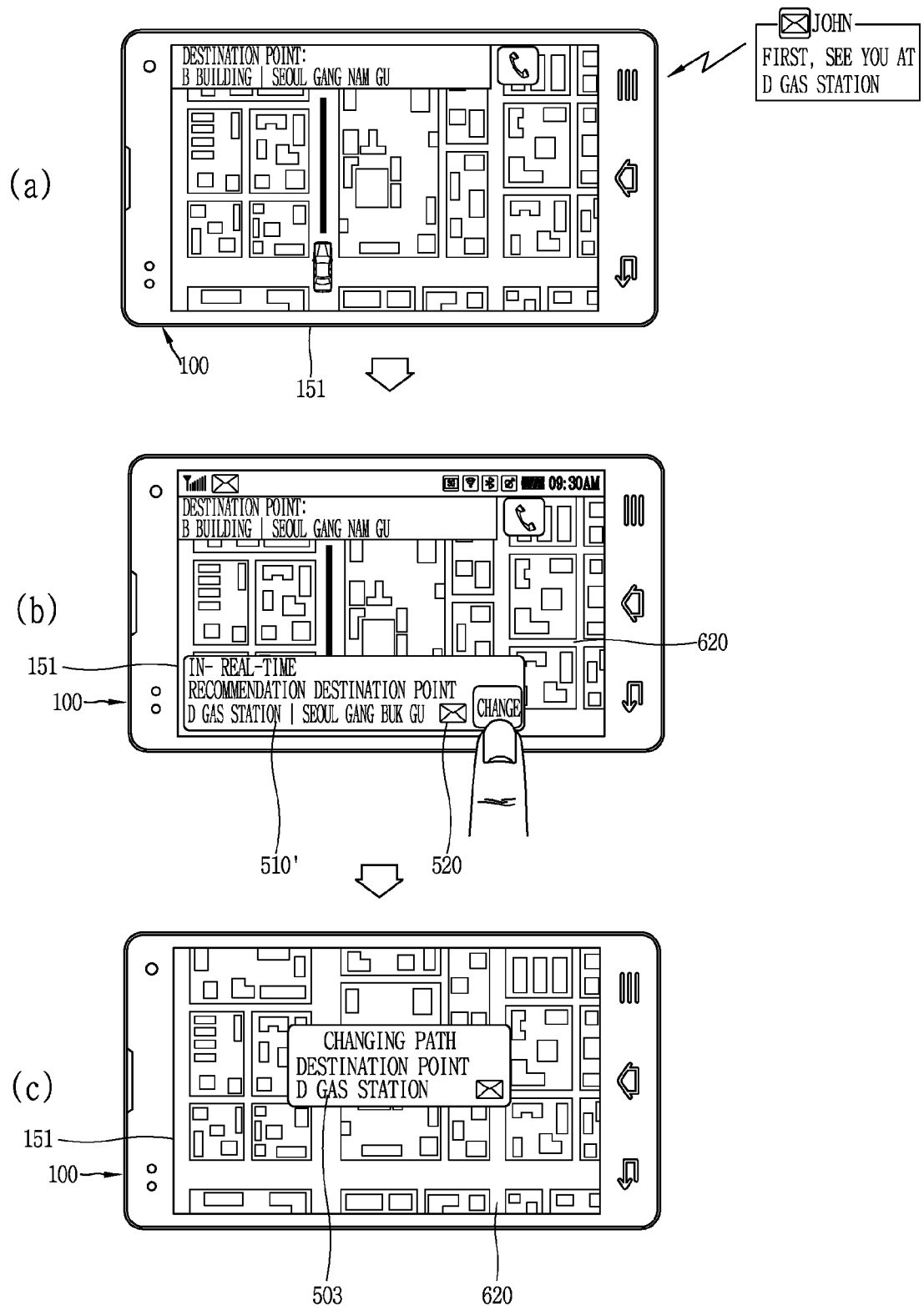

A control method of providing the in-real-time location information according to an event that is received in the mobile terminal while on the move is described referring to FIGS. 12B(a) to 12B(c).

While the image display apparatus 200 guides the path in a state where the image display apparatus 200 and the mobile terminal 100 are connected with each other, when the event occurs in the mobile terminal 100, the extraction unit extracts the in-real-time location information 510' from the data that is included in the event.

For example, if the mobile terminal 100 receives a message, the controller 212 extracts the location information from the data that is included in the received message. If the extracted in-real-time location information is present, the controller 212 controls the display unit 201*e* in such a manner that the second pop-up window 502 which includes the in-real-time location information 510' and the graphic image 520 corresponding to the source of the in-real-time location information is output. The second pop-up window 502 may further include an icon for receiving the touch input for changing the destination point to the in-real-time location information 510'.

Based on the touch input that is applied to the icon, the controller 212 changes the destination point to the in-real-time location information 510'. In addition, a message 503 indicating that the destination point was changed is output to the display unit 201*e*.

Accordingly, if the location information that the mobile terminal receives from the external terminal is present regardless of the user's intention, the image display apparatus immediately provides the user with that location information for application as the destination point.

Figure 12C:
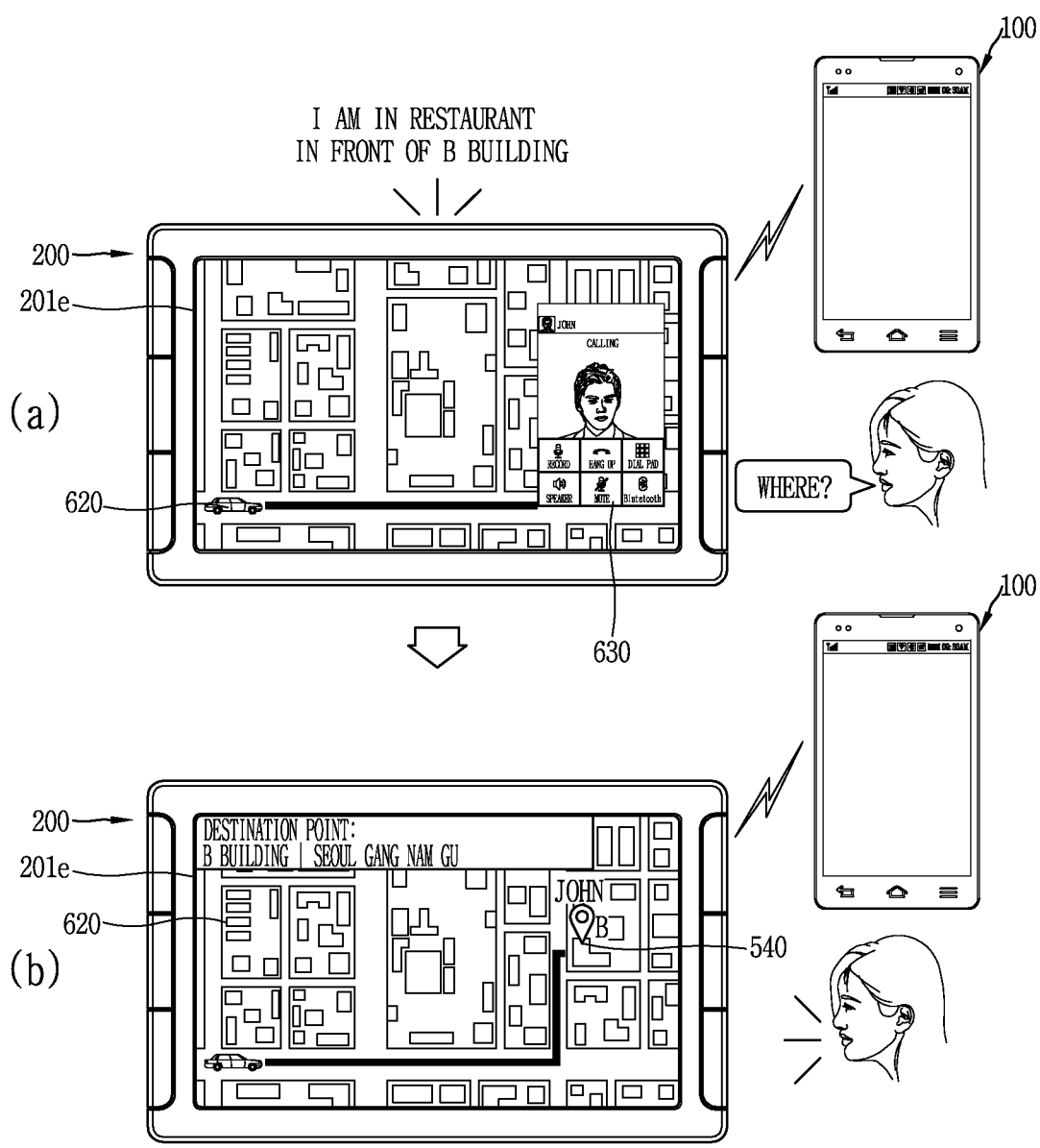

A control method of displaying the in-real-time location information on the guide screen is described referring to FIGS. 12C(a) and 12C(b). FIG. 12C(a) is a diagram illustrating a state where the communication mode for communicating with the external terminal is activated while the path-guiding function is performed. The extraction unit extracts the location information from the voice that is input or output through the image display apparatus in the communication mode.

Referring to FIG. 12C(b), the controller 212 controls the display unit 201*e* in such a manner that location information 540 extracted in the communication mode is displayed on the guide screen 620.

For example, if the location information 540 corresponds to an area that is included in the guide screen 620, the controller 212 displays the location information 540 on the guide screen 620. In addition, if words from which to infer that a current location of the user is close to the location information, such as "located close to," "almost there," and "similar area," are included in the voice, the location information 540 is displayed.

In addition, although not illustrated in the drawing, the location information 540 is changed as the destination point, based on the user's control command.

Accordingly, the user can not only communicate with the other party while the path-guiding function is performed, but also compare the location information from the other party with the current location of the user. As a result of the comparison, the user can be provided directly with the location information from the other party.

Figure 12D:
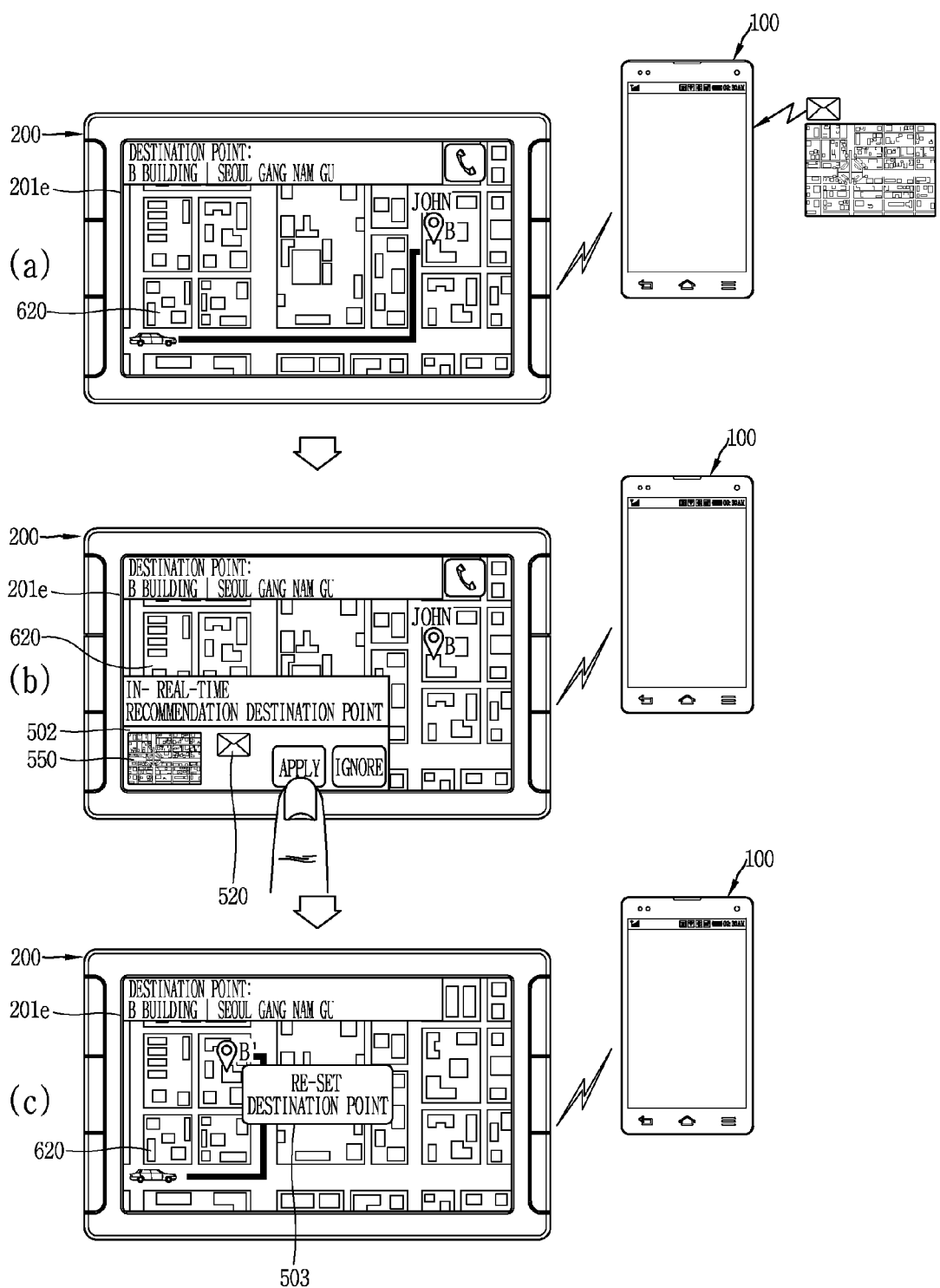

Referring to FIGS. 12D(a) to 12D(c), a control method is described in which the location information is provided if the map image including the location information is received. The controller 212 controls the display unit 201*e* in such a manner that a map image 550 being received is extracted and is displayed on the second pop-up window 502 that is output on the guide screen 620.

The second pop-up window 502 includes an icon for selecting whether or not the currently-set destination point is changed to the destination point included in the map image 550.

Although not illustrated in the drawings, the map image 550 is entirely output to the display unit 201e, based on the touch input that is applied to the map image 550 included in the second pop-up window 502 or to the graphic image 520 for displaying the source.

In addition, the controller 212 controls the display unit 201e in such a manner that the guide screen 620 being currently output to the display unit 201e and the map image 550 are compared with each other and are output.

The controller 212 changes the destination point to the location information included in the map image 550 according to the user's selection and control the display unit 201e in such a manner that the message 503 indicating that the destination point was changed is output.

Figure 13A:
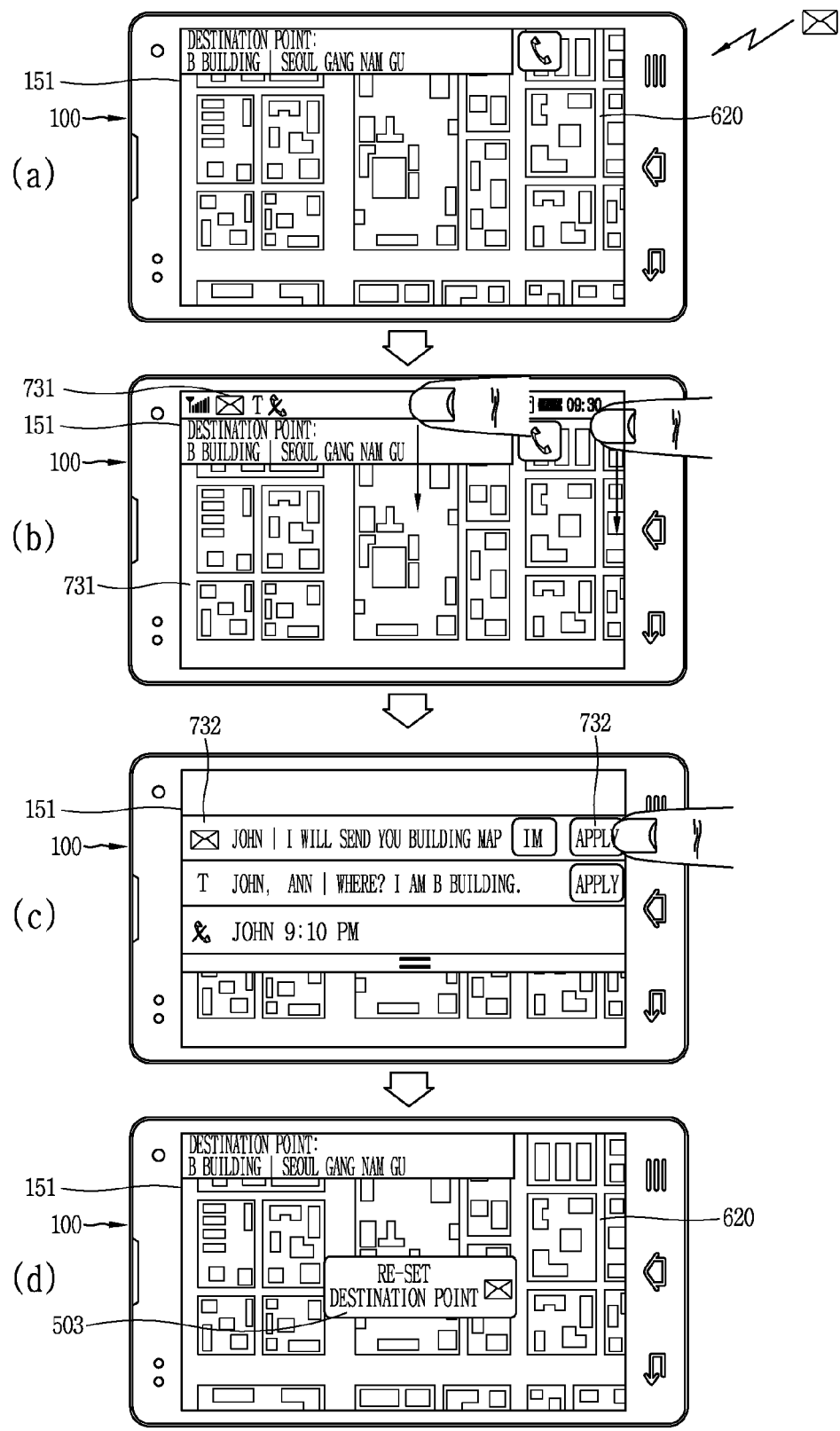
FIGS. 13A and 13B are diagrams for describing a control method of outputting the location information on an event that is received while the path-guiding function is performed.

FIGS. 13A(a) to 13A(c) and 13B(a) to 13B(c) are diagrams for describing a control method of outputting the location information on an event that is received while the path-guiding function is performed.

Referring to FIGS. 13A(a) to 13A(c), the control method of providing the received event if the path-guiding application on the mobile terminal 200 is executed. Referring to FIGS. 13A(a) and 13A(b), if the message is received, the controller 180 performs control in such a manner that the message is display on a status display line on the display unit 151.

At this point, the status display line corresponds to one region of the display unit 151 for briefly displaying status of elements for operating the mobile terminal, current information, and the received event.

The controller 180 controls the display unit 151 in such a manner that an icon 731 corresponding to the received event is displayed on the status display line. Based on the touch input that is applied to the status display line (for example, the touch input corresponds to a dragging-type touch input that is a continuously-applied touch input moving in one direction), the controller 180 controls the display unit 151 in such a manner that a status display screen 732 on which each status information is displayed is output.

While the path-guiding application is performed, the status display screen 732 is output in a manner that is superimposed onto the guide screen 620, in which case the status display screen 732 is output in a translucent manner.

The controller 180 extracts the location information from pieces of information included in the status display screen 732. For example, the location information included in the received message is extracted.

If the location information is status information that is extracted, the controller 180 controls the display unit 151 in such a manner the location information is displayed on the status display screen 732. For example, the controller 180 performs control in such a manner that the location information included in the received message is output along with an icon corresponding to the message application.

In addition, the controller 180 controls the display unit 151 in such a manner that an application icon 732 for changing the location information to the destination point is together displayed on the status information including the location information. Referring to FIG. 13A(c), because in a case of the status information alerting the user to an incoming call that arrived during the user's absence, the location information included in the status information is not extracted, the application icon 732 is not displayed, but because the location information is included in the message, the application icon 732 is together output.

Based on the touch input that is applied to the application 732, the controller 180 changes the location information to the destination point, and outputs the message 503 indicating that the destination point was changed.

On the other hand, although not illustrated in the drawings, while the status display screen 732 is output, when the dragging-type touch input that moves in the opposite direction is applied to the status display screen 732, the controller 180 controls the display unit 151 in such a manner that the status display screen 732 disappears.

That is, the controller 180 does not directly output the location information that is distracted while the path-guiding function is performed, as the in-real-time location information, and provides the location information at a time. Thus, if the in-real-time location information is not necessary, the guide screen is provided without any interruption.

In addition, with the mobile terminal, the user can grasp the event and the location information that is received and extracted, respectively, while the path-finding function is performed. Thus, if the mobile terminal is used as a path-guiding apparatus, the convenience of performing a different function is improved.

Figure 13B:
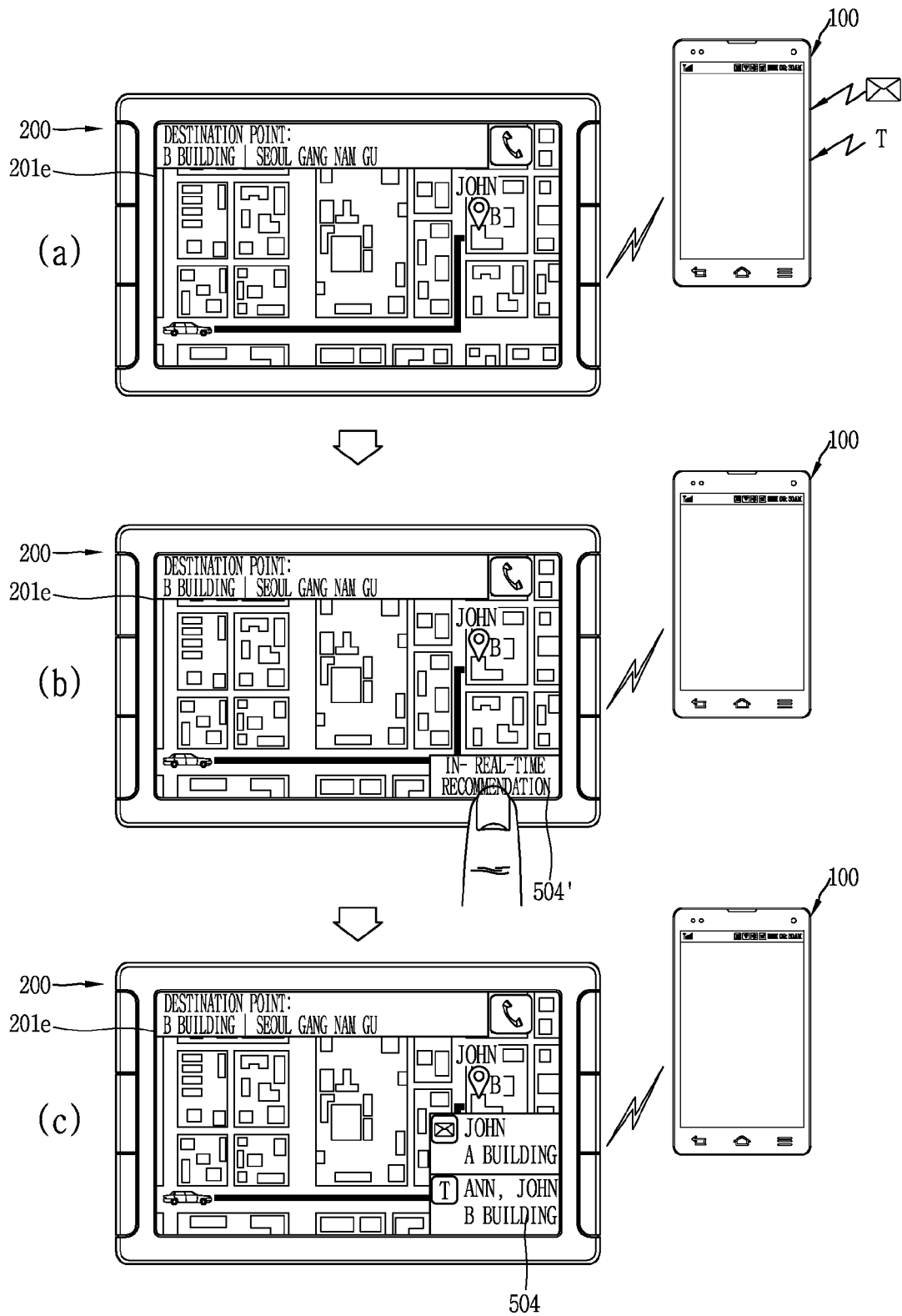

Referring to FIGS. 13B(a) to 13B(c), a control method is described in which if you the user applies a control command for providing the in-real-time location information, the in-real-time location information is provided.

Referring to FIGS. 13B(a) and 13B(b), while the path-guiding function is performed by the image display apparatus 200, at least one event is received in the mobile terminal 100 connected to the image display apparatus 200.

The controller 212 extracts the location information from the data that is included in the received event. If the location information is extracted using the event that is received in the mobile terminal 100, the controller 212 outputs an icon 504' in a manner that is superimposed onto the guide screen 620.

Referring to FIG. 13B(c), based on the touch input that is applied to the icon 504', the controller 212 controls the display unit 201e in such a manner that a third pop-up window 504 is output in real time. The third pop-up window 504 includes the in-real-time location information that is received by the mobile terminal and a graphic image of the corresponding source.

Although not illustrated in the drawings, based on the touch input that is applied to the in-real-time location information, the controller 212 displays the location on the guide screen 620 or changes the destination point. In addition, bases on the touch input that is applied to the graphic image, the controller 212 displays the source (for example, outputs an execution screen of the corresponding application).

According to the present embodiment, if the location information is received, when the user's control command is not present, the location information is not output. Thus, the user can be provided with the extracted in-real-time location information if necessary.

Figure 14A:
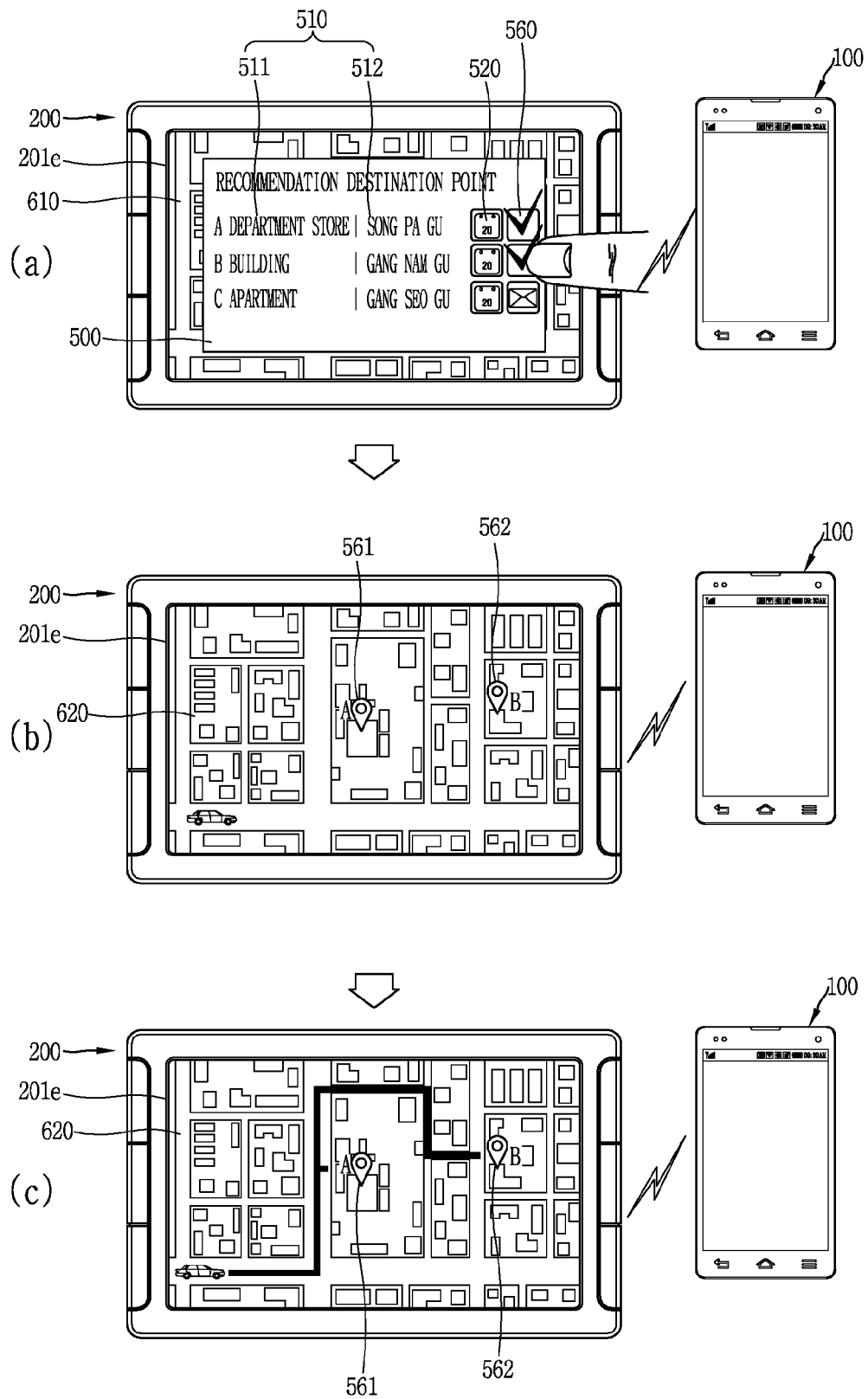
FIGS. 14A and 14B are diagrams for describing a control method of setting multiple destination points using the location information.

FIGS. 14A(a) to 14A(c) and 14B(a) to 14B(c) are diagrams for describing a control method of setting the multiple destination points using the location information.

A control method of designating the multiple pieces of location information as the destination point and providing the path is described referring to FIG. 14A(a). The controller 212 controls the display unit 201e in such a manner that the multiple extracted pieces of location information 510, the graphic image 520 for displaying the source, and a selection 560 are displayed.

The selection icons 560 are formed to correspond to the multiple sources, respectively. Based on the touch input that is applied to the selection icon 560, the user can select the corresponding location information. Although not illustrated in the drawings, according to the order in the touch inputs are applied to the selection icon 560, the controller 212 determines the order in which the pieces of location information are set to be the destination point.

Referring to FIG. 14A(b), the controller 212 controls the display unit 201e in such a manner that the guide screen 620 including indicators 561 and 562 which indicate the multiple selected pieces of location information, respectively, is output.

In addition, the controller 212 designates the multiple selected pieces of location information as the multiple destination points and generates the path that is based on the current location of the user.

According to the present embodiment, the multiple extracted pieces of location information are used and the multiple destination points are set. Thus, the path is accordingly grasped. Although not illustrated in the drawings, if based on the control command, the pieces of location information that are grouped as similar in category are output together (refer to FIGS. 11A(a) and 11A(b) and 11B(a) and 11B(b)), the user can be provided with the path for successively reaching the related pieces of location information.

Figure 14B:
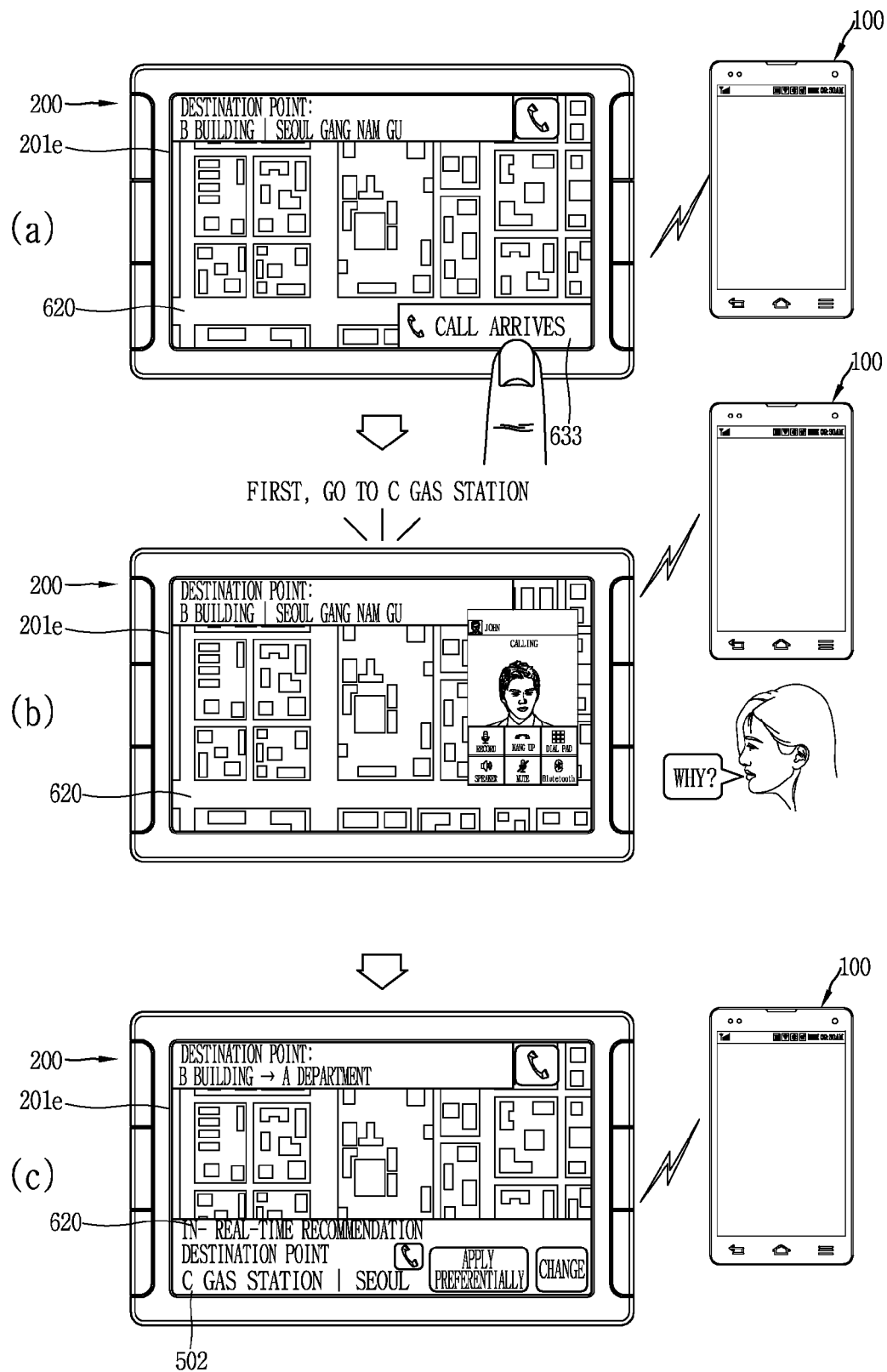

Referring to FIGS. 14B(a) to 14B(c), a control method is described in which the in-real-time location information that is received while the path-guiding for the pre-set destination point is provided is set to be an additional destination point.

Referring to FIGS. 14B(a) 14B(c), when an event is received in the mobile terminal, the controller 212 performs control in such a manner that an icon 633 for receiving the event is output on the display unit 201. For example, when a call is received in the mobile terminal 100, the icon 633 is output to the display unit 201e, and when the touch input is applied to the icon 633, the communication mode is activated.

The controller 212 performs control in such a manner that the call received in the mobile terminal 100 is transferred to the image display apparatus 200 for answering. That is, the image display apparatus 200 receives or outputs the user' voice and the other party's voice.

When the switching to the communication mode is made, an execution screen of the communication application is output to the display unit 201e. In a state where the communication mode is activated, the extraction unit extracts the location information included in voice data.

When the location information is extracted using the voice data, the controller 212 controls the display unit 201e in such a manner that the second pop-up window 502 including the extracted location information is output. In addition, the second pop-up window 502 may further include an icon for receiving the touch input in order to add the extracted location information as a destination point that is separate from the pre-set destination point, or to change the destination point.

For example, by applying the control command to the icon, the user sets the extracted location information to be a destination point that is to be reached earlier or later than the destination point.

For example, if words (for example, "first," "path change," and the like) whose meaning relate to the changing of the path are included in the voice data, the controller 212 provides the location information for changing the path.

According to the present embodiment, by using the location information that is extracted using the received event while the path-guiding function is performed, the destination point is changed or added, and the pre-set path is changed.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A terminal comprising:
a display configured to display information; and
a controller configured to cause the display to:
    display a list of candidate destination locations and corresponding source indicators for the list of candidate destination locations in response to execution of a path-guiding application, wherein each of the source indicators is related to an application that has been used to collect a corresponding candidate destination location;
    display guidance information comprising a route to a first destination location in response to selection of the first destination location from the list of candidate destination locations; and
    display an executed screen of an application related to a corresponding source indicator for the first destination location in response to selection of the corresponding source indicator from the list of candidate destination locations, wherein the executed screen of the application comprises the first destination location.

2. The terminal of claim 1, wherein the controller is further configured to cause the display to:
    display a switching icon; and
    switch between displaying the guidance information and the executed screen in response to an input to the switching icon.

3. The terminal of claim 1, further comprising:
a speaker configured to output audio;
wherein the controller is further configured to cause the speaker to output audio associated with the guidance information.

4. The terminal of claim 1, wherein the controller is further configured to cause the display to display the list in an order based on at least:
    a distance to each destination location of the list of candidate destination locations;
    a most recent time when said each destination location of the list of candidate destination locations was visited;
    a most recent time when information related to each destination location of the list of candidate destination locations was accessed;
    a time when information related to said each destination location of the list of candidate destination locations was received; or
    an order set by a user.

5. The terminal of claim 1, further comprising a wireless communication unit, wherein the list of candidate destination locations is received from an external terminal via the wireless communication unit.

6. The terminal of claim 5, wherein the received list of candidate destination locations is based on information extracted from a text, an image, voice audio, or a media file existing at the external terminal.

7. The terminal of claim 5, wherein the controller is further configured to receive event information associated with an event at the external terminal and cause the display to display an execution screen of the event.

8. The terminal of claim 5, wherein the controller is further configured to cause the display to display updated location information related to a second destination location received from the external terminal via the wireless communication unit, and wherein the updated location information is generated from an event occurring at the external terminal.

9. The terminal of claim 8, wherein the controller is further configured to cause the display to display updated guidance information comprising a route to the second destination location.

10. The terminal of claim 9, wherein the updated guidance information comprises a route to the first destination location and the second destination location successively.

11. The terminal of claim 5, wherein the controller is further configured to cause the display to display:
an event icon indicating an occurrence of an event at the external terminal; and
updated_location information associated with the event in response to an input selecting the displayed event icon.

12. A method of controlling a terminal, the method comprising:
displaying, on a display of the terminal, a list of candidate destination locations and corresponding source indicators for the list of candidate destination locations in response to execution of a path-guiding application, wherein each of the source indicators is related to an application that has been used to collect a corresponding candidate destination location;
displaying, on the display, guidance information comprising a route to a first destination location in response to selection of the first destination location from the list of candidate destination locations; and
displaying, on the display, an executed screen of an application related to a corresponding source indicator for the first destination location in response to selection of the corresponding source indicator from the list of candidate destination locations, wherein the executed screen of the application comprises the first destination location.

13. The method of claim 12, wherein the list of candidate destination locations is received from an external terminal via a wireless communication unit of the terminal.

14. The method of claim 13, further comprising:
receiving updated location information related to a second destination location received from the external terminal, wherein the updated location information is generated from an event occurring at the external terminal; and
displaying updated guidance information comprising a route to the second destination location.

15. The method of claim 13, wherein the received list of candidate destination locations is based on information extracted from a text, an image, voice audio, or a media file existing at the external terminal.

16. The method of claim 13, further comprising:
receiving event information associated with an event at the terminal; and
displaying an execution screen of the event.

* * * * *